US006912490B2

(12) United States Patent
Dodge

(10) Patent No.: US 6,912,490 B2
(45) Date of Patent: Jun. 28, 2005

(54) IMAGE PROCESSING APPARATUS

(75) Inventor: Alexandre Percival Dodge, Berkshire (GB)

(73) Assignee: Canon Kabushiki Kaisha, Tokyo (JP)

( * ) Notice: Subject to any disclaimer, the term of this patent is extended or adjusted under 35 U.S.C. 154(b) by 766 days.

(21) Appl. No.: 09/983,039

(22) Filed: Oct. 22, 2001

(65) Prior Publication Data

US 2004/0037459 A1 Feb. 26, 2004

(30) Foreign Application Priority Data

Oct. 27, 2000 (GB) .............................................. 0026336

(51) Int. Cl.[7] .............................................. G06F 17/50
(52) U.S. Cl. ............................. 703/1; 345/419; 345/427
(58) Field of Search ............................. 703/1; 345/419, 345/420, 427, 619; 382/154

(56) References Cited

U.S. PATENT DOCUMENTS

| 5,815,683 | A | | 9/1998 | Vogler | 395/500 |
|---|---|---|---|---|---|
| 5,850,352 | A | * | 12/1998 | Moezzi et al. | 345/419 |
| 5,949,433 | A | * | 9/1999 | Klotz | 345/634 |
| 5,960,125 | A | | 9/1999 | Michael et al. | 382/294 |
| 6,081,273 | A | * | 6/2000 | Weng et al. | 345/420 |
| 6,781,618 | B2 | * | 8/2004 | Beardsley | 348/43 |
| 6,792,140 | B2 | * | 9/2004 | Matusik et al. | 382/154 |

FOREIGN PATENT DOCUMENTS

| JP | 9-170914 | 6/1997 |
|---|---|---|
| WO | WO 98/18117 | 4/1998 |
| WO | WO 01/39119 | 5/2001 |
| WO | WO 01/39124 A2 | 5/2001 |

OTHER PUBLICATIONS

Peter Eisert, Eckehard Steinbach, Bernd Girod, "Automatic Reconstruction of Stationary 3–D Objects from Multiple Uncalibrated Camera Views," IEEE Transactions on Circuits and Systems For Video Technology, vol. 10, No. 2, Mar. 2000, pp. 261–277.

Wolfgang Niem, Jochen Wingbermuhle, " Automatic Reconstruction of 3D Objects Using a Mobile Monoscopic Camera," IEE Proceedings, International Conference on Recent Advances in 3–D Digital Imaging and Modeling, Mar. 1997, pp. 173–180.

Wolfgang Niem, "Automatic reconstruction of 3D objects using a mobile camera", *Image and Vision Computing*, 17 (1999) pp. 125–134.

(Continued)

*Primary Examiner*—Albert W. Paladini
(74) *Attorney, Agent, or Firm*—Fitzpatrick, Cella, Harper & Scinto

(57) ABSTRACT

A method is provided for generating an image of a subject object to show a predetermined part thereof. The subject object is positioned so that a selected part of the subject object is positioned in a predetermined direction relative to the calibration pattern. Images of the subject object and calibration pattern from different relative recording positions and/or orientations are recorded. Data defining the recorded images is processed to calculate the relative positions and orientations at which the images were recorded by comparing the calibration pattern in the images with stored data defining the calibration pattern. Data defining a three-dimensional computer model of the subject object relative to the stored calibration pattern is generated using the calculated positions and orientations. Data defining an image of the three-dimensional computer model showing the selected part of the subject object is generated using a viewing camera defined relative to the stored calibration pattern.

64 Claims, 15 Drawing Sheets

OTHER PUBLICATIONS

Steven J. Gortler et al., "The Lumigraph", *Computer Graphics Proceedings*, Annual Conference Series (1996) ACM–0–89791–764–4/96/008, pp. 43–54.

Richard I. Hartley, "Euclidean Reconstruction from Uncalibrated Views", *Applications of Invariance in Computer Vision*, Mundy, Zisserman and Forsyth, eds., Azores 1993, pp. 237–256.

Open GL Programing Guide Second Edition: "The Official Guide to Learning OpenGL Version 1.1" by Woo, Neider and Davis, Addison–Wesley, ISBN 0201461382 pp. 116–123.

* cited by examiner

IMAGE PROCESSING APPARATUS

The present invention relates to the recording of images of an object and the processing of the image data to determine the position and orientation at which the images were recorded, to generate data defining a three-dimensional (3D) computer model of the object, and to display images of the 3D computer model.

3D computer models of objects are useful for many applications. In particular, there is now a growing demand from members of the public to have 3D computer models of objects for uses such as the embellishment of internet sites, etc. In addition, with the growing popularity of internet sales, especially internet auctions, the use of a 3D computer model of an article provides greater opportunity for a potential purchaser to inspect the article in detail than a number of fixed images of the article, because the potential purchaser can view the 3D computer model from any number of different chosen positions and orientations.

The inventor in the present case has found, however, that the generation of a 3D computer model and subsequent display of images thereof suffers from a number of problems.

In particular, the inventor has realised that, when images of a 3D computer model are displayed, the first image displayed is typically not the best image of the modelled object for the intended purpose. For example, this can be a particular problem for applications such as internet sales because a potential purchaser will often inspect a large number of articles before deciding on a purchase and will spend only a small amount of time inspecting each individual article. Accordingly, in this situation, the first image of the 3D computer model should show a view of the object (usually the front of the object) which best presents the object and causes the viewer to inspect the object further (by specifying different viewpoints and view directions to generate further images of the 3D computer model of the object). However, the seller or owner of the object has no control over what the first image shows.

The first image of a 3D computer model which is displayed becomes more important if the viewer cannot subsequently define a new viewing position and/or direction, for example because of limited processing capability, or if it is difficult and/or time consuming for the viewer to define a new viewing position and/or direction, for example because of limited user interface features.

It is an object of the present invention to address this problem.

In particular, it is an object of one aspect of the present invention to enable a user to determine what the first image of a 3D computer model of an object will show by the way in which the object is imaged in order to generate image data from which the 3D computer model is produced.

According to the present invention, a 3D computer model of a subject object is generated from images of the subject object. A user is provided with a calibration pattern and information specifying a position or direction relative to the pattern on which the viewing direction for the first image of the 3D computer model will be based. Accordingly, knowing the viewing direction of the first camera the user can orientate the subject object relative to the calibration pattern so that the desired part of the subject object appears in the first image. In subsequent processing, the recorded images are processed to generate data defining the 3D computer model and each time the 3D computer model is accessed for viewing, the first image of the 3D computer model is generated using a viewing camera relative to the predetermined position or direction in the calibration pattern.

By performing processing so as to generate data to control the display of the first image of the 3D computer model in dependence upon a position or direction on the calibration object, the user can select which part of the object is to appear in the first image by aligning the desired object part with the position or direction on the calibration object.

The present invention also provides a processing apparatus or method for use in the system above. For example, the present invention provides a method or apparatus for generating a 3D computer model of a subject object from images of the subject object, in which stored data defining a calibration pattern and a position or direction relative to the pattern is used to process images showing both the subject object and the calibration pattern to define a 3D computer model and a viewing camera therefor arranged relative to each other in dependence upon the position or direction in the pattern.

The viewing camera may be a default viewing camera having a predetermined position and viewing direction so that the position and orientation of the 3D computer model are calculated relative to the camera, or alternatively, the position and orientation of the viewing camera may be calculated relative to the 3D computer model.

The present invention also provides an apparatus or method in which data is received defining a 3D computer model and a position or direction relative to the 3D computer model, and either a viewing camera is defined for the 3D computer model in dependence upon the defined position or direction, or the 3D computer model is positioned relative to a predetermined viewing camera in dependence upon the defined position or direction.

In another aspect, according to the present invention, a user is provided with a calibration pattern and information specifying a position or direction relative to the pattern to enable the user to position a subject object relative to the pattern. Images of the subject object and calibration pattern are then processed to calculate the direction of the camera relative to the calibration pattern when each image was recorded, and to select an image for display in dependence upon the calculated camera viewing directions relative to the specified position or direction.

The present invention further provides computer program products for configuring programmable processing apparatus for use in the above.

Embodiments of the invention will now be described, by way of example only, with reference to the accompanying drawings, in which:

FIG. 1 schematically shows the components of a first embodiment of the invention, together with the notional functional processing units into which the computer components may be thought of as being configured when programmed by programming instructions;

FIG. 6 illustrates images of the object which are input to the processing apparatus 2,4 in FIG. 1 and stored at step S4-30 in FIG. 4a;

First Embodiment

Figure 1:
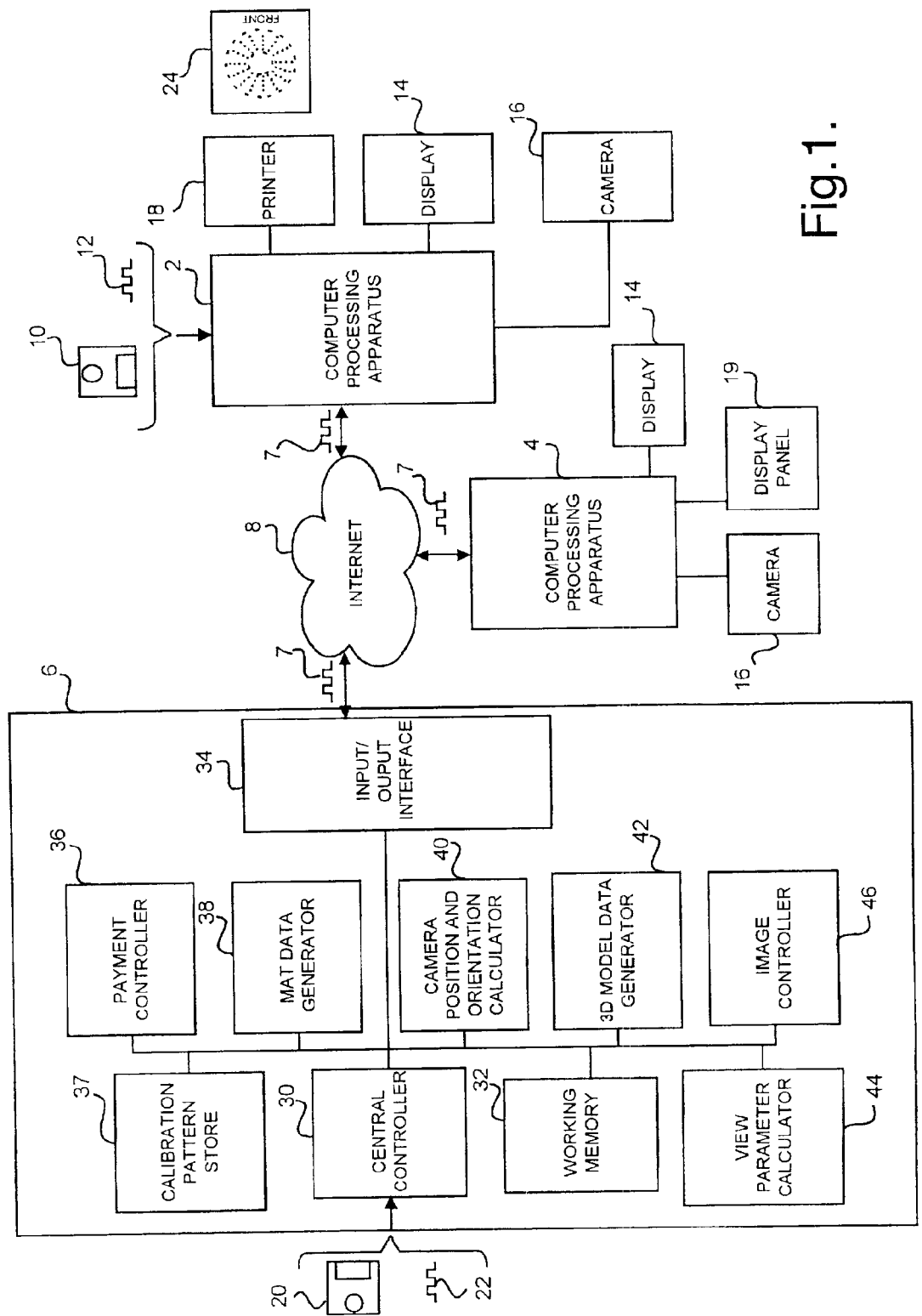

Referring to FIG. 1, an embodiment of the invention comprises a plurality of computer processing apparatus 2, 4, 6 connected to exchange data by transmitting signals 7 via a communications network 8, such as the Internet.

In this embodiment each processing apparatus 2, 4 is used by a customer, and has connected thereto a display device 14, such as a conventional personal computer monitor and a digital camera 16. In addition, the processing apparatus 2 has connected thereto a printer 18, and processing apparatus 4 has connected thereto a horizontal flat display panel 19 having controllable pixels, such as the PL400 manufactured by WACOM.

Each of the processing apparatus 2, 4 is a conventional personal computer programmed to operate in accordance with programming instructions input, for example, as data stored on a data storage medium, such as disk 10, and/or as a signal 12 input to the processing apparatus 2, 4, for example from a remote database, by transmission over a communication network such as the Internet 8 or by transmission through the atmosphere and/or by a user via a user input device such as keyboard (not shown).

Processing apparatus 6 is provided by a network auction company. In this embodiment, processing apparatus 6 comprises a conventional programmable computer, containing in a conventional manner, one or more processors, memories, graphics cards, etc.

The processing apparatus 6 is programmed to operate in accordance with programming instructions input, for example, as data stored on a data storage medium, such as disk 20, and/or as a signal 22 input to the processing apparatus 6, for example from a remote database, by transmission over a communication network such as the Internet 8 or by transmission through the atmosphere and/or entered by a user via a user input device such as a keyboard (not shown).

As will be described in more detail below, the programming instructions comprise instructions to cause the processing apparatus 6 to become configured to process payments from a user, and in response to a valid payment, to transmit instructions to a connected customer computer processing apparatus 4, 6 to enable the customer apparatus to control printer 18 to print a calibration object which, in this embodiment, comprises a photographic mat 24 having a special pattern of features thereon, or to control a display panel 19 to display the pattern of features so that the display displaying the features acts as a photographic mat. In addition, instructions are sent to the customer processing apparatus 4,6 instructing the user how to place a subject object on the photographic mat relative to the pattern of features thereon so that the desired part of the subject object appears in the first image of a subsequently generated three-dimensional computer model of the subject object. The programming instructions further cause the processing apparatus 6 to become configured to process data received from a customer computer processing apparatus 2, 4 defining images of the subject object and the photographic mat so as to calculate the positions and orientations at which the images were recorded by detecting the positions of the features of the photographic mat pattern in the images, and to use the calculated positions and orientations to generate data defining a three-dimensional computer model of the subject object. The three-dimensional computer model is then made available for viewing on a display at a further computer apparatus (not shown) connected to the internet 8 in such a way that the first image displayed at the further computer apparatus is related to the pattern of features on the calibration object. In this way, by aligning the subject object so that the part thereof which is to appear in the first image is aligned in a predetermined way with reference to the pattern of features on the calibration object, the user can control the content of the first image of the three-dimensional computer model displayed at the further apparatus.

When programmed by the programming instructions, processing apparatus 6 can be thought of as being configured as a number of functional units for performing processing operations. Examples of such functional units and their interconnections are shown in FIG. 1. The units and interconnections illustrated in FIG. 1 are, however, notional and are shown for illustration purposes only to assist understanding; they do not necessarily represent units and connections into which the processor, memory etc of the processing apparatus 6 become configured.

Referring to the functional units shown in FIG. 1, a central controller 30 provides control and processing for the other functional units, and a memory 32 is provided for use by central controller 30 and the other functional units.

An input/output interface 34 is arranged for the output of signals 7 to, and receipt of signals 7 from, apparatus connected to the internet 8, including the connected customer computer processing apparatus 2, 4.

A payment controller 36 is arranged to perform processing operations to obtain and check payments from a customer computer processing apparatus 2, 4.

Calibration pattern store 37 stores data defining different patterns of features to be printed or displayed on the photographic mat. As will be described in more detail below, the subject object(s) for which a three-dimensional computer model is to be generated is placed on a photographic mat 24 printed by printer 18 or on the display panel 19 on which the photographic mat is displayed, and images of the subject object(s) and photographic mat are recorded at different positions and orientations and processed to generate the 3D computer model.

In this embodiment, data is stored in calibration pattern store 37 defining patterns comprising spatial clusters of features for example as described in copending PCT Patent Application GB00/04469 (WO-A-01-39124) (the full contents of which are incorporated herein by cross-reference), patterns comprising concentric circles connected by radial line segments with known dimensions and position markers in each quadrant, for example as described in "Automatic Reconstruction of 3D Objects Using a Mobile Camera" by Niem in Image and Vision Computing 17 (1999) pages 125–134, patterns comprising concentric rings with different diameters, for example as described "The Lumigraph" by Gortler et al in Computer Graphics Proceedings, Annual Conference Series, 1996 ACM-0-89791-764-4/96/008, and patterns comprising coloured dots with each dot having a different hue/brightness combination so that each respective dot is unique, for example as described in JP-A-9-170914.

Figure 2:
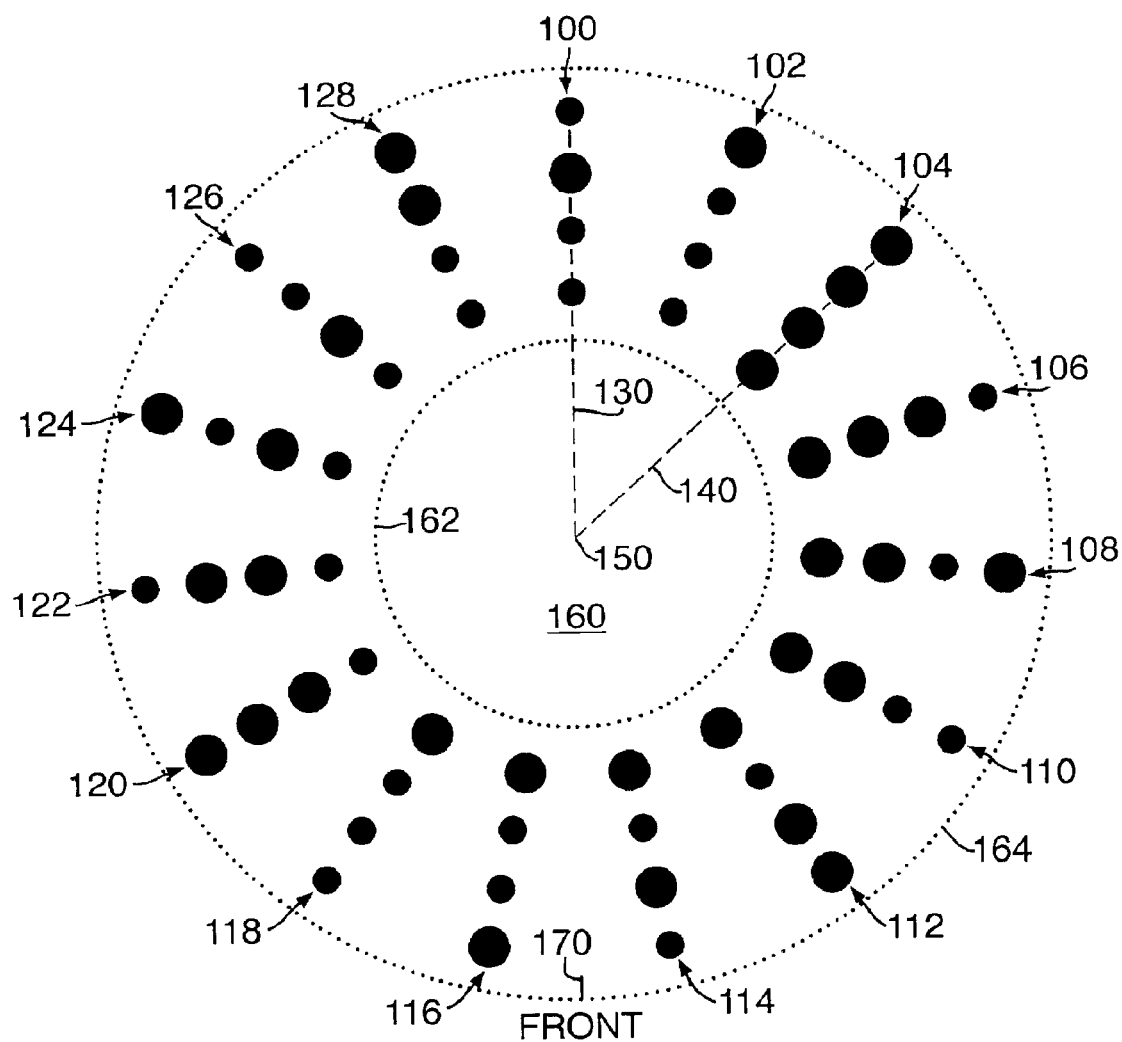
FIG. 2 illustrates a pattern of features stored in calibration pattern store 37 in apparatus 6 in FIG. 1 for printing or displaying on a photographic mat.

By way of example, FIG. 2 shows a pattern of features comprising spatial clusters of features as described in co-pending PCT patent application GB00/04469 (WO-A-01-39124).

Referring to FIG. 2, the pattern comprises a plurality of clusters 100–128. Each cluster comprises four features, which, in this example, are black circles.

Each feature has one of two areas, that is, either large or small, with a large feature having an area twice the area of a small feature.

Within each cluster 100–128, the centres of the four circles are arranged on an imaginary straight line (that is, a line not present on the printed or displayed photographic mat—indicated at 130 for cluster 100 and 140 for cluster 104) with each straight line being a radius of the same circle. Accordingly, a line through the centre of the circles in a given cluster passes through the centre 150 of the circle.

In this embodiment, the clusters 100–128 are arranged around a central blank area 160 defined by a circle 162.

When processing an image of a subject object on a photographic mat having the pattern shown in FIG. 2, each black circle in the pattern can be uniquely identified by detecting four circles which lie on a radial straight line, and by determining the relative sizes and positions of the circles within the cluster of four (thereby uniquely identifying the cluster and each circle therein). Accordingly, by identifying the features on the photographic mat and their relative positions in an image, the imaging position and orientation can be determined. This processing is described in detail in copending PCT application GB00/04469 (WO-A-01-39124).

Other suitable patterns and the processing associated therewith are described in "Automatic Reconstruction of 3D Objects Using a Mobile Camera" by Niem in Image and Vision Computing 17 (1999) pages 125–134, "The Lumigraph" by Gortler et al in Computer Graphics Proceedings, Annual Conference Series, 1996 ACM-0-89791-764-4/96/ 008 and JP-A-9-170914.

Calibration pattern store 37 stores each pattern of features together with a coordinate system relative to the pattern of features. The coordinate system, in effect, defines a reference position and orientation of the photographic mat and, as will be explained in more detail below, processing apparatus 6 calculates the positions and orientations at which each input image was recorded in the defined coordinate system (and thus relative to the reference position and orientation). In addition, however, in this embodiment, the coordinate system for each pattern is also used to define a viewing position and viewing direction from which the first image to be displayed each time the resulting three-dimensional computer model is accessed for viewing will be rendered. Consequently, therefore, because the viewing position and viewing direction of the first image is defined in this embodiment relative to the pattern of features on the photographic mat, the user at computer processing apparatus 2,4 can be informed of a position on the photographic mat which the part of the subject object which is to appear in the first image should face.

Thus, referring again to FIG. 2, in this embodiment, each pattern of features includes a marker 170 to indicate to the user the position on the photographic mat 24 that the part of the subject object which the user wishes to appear in the first image of the subsequently generated 3D computer model should face. In addition, in this embodiment, the word "FRONT" is also stored as part of the pattern alongside the marker 170 to indicate the purpose of the marker 170.

Figure 3:
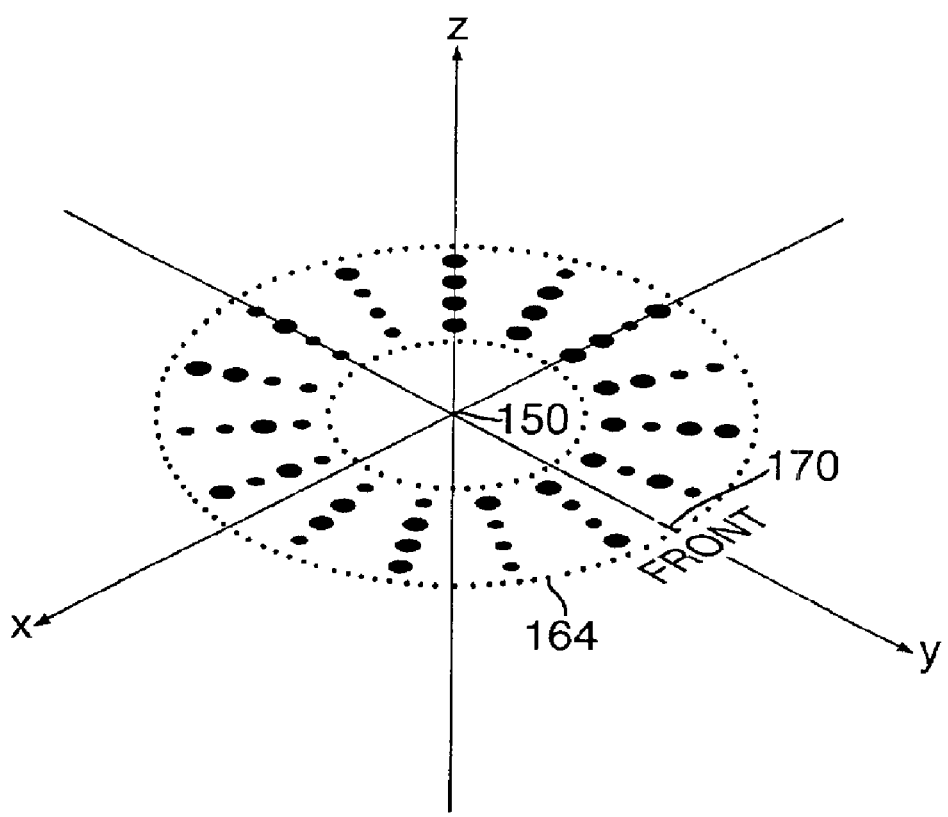
FIG. 3 illustrates how the features in the pattern shown in FIG. 2 are defined in a coordinate system in the first embodiment.

FIG. 3 illustrates how the features making up the pattern in FIG. 2 are defined in a coordinate system in this embodiment.

Referring to FIG. 3, the coordinate system in this embodiment is a Cartesian coordinate system defined by orthogonal x, y and z axes. The origin of the coordinate system is at the centre 150 of the pattern of features on the photographic mat 24, and the x and y axes lie in the plane of the features making up the pattern. Thus, the z coordinate of each feature is 0. The y axis passes through the front marker 170. The radius of the circle 160 defining the boundary of the pattern of features is defined to be one unit in the coordinate system.

Referring again to FIG. 1, mat data generator 38 generates control signals which are sent as signals 7 to customer processing apparatus 2 to enable customer apparatus 2 to control printer 18 to print a photographic mat 24 on a recording medium such as a piece of paper, or to customer processing apparatus 4 to enable customer apparatus 4 to control display panel 19 to display the photographic mat. More particularly, mat data generator 38 generates the control signals using data stored in calibration pattern store 37 defining a calibration pattern and signals received from the customer computer processing apparatus 2,4 providing details of the size of subject object and the type of printer 18 or display panel 19 (as will be described below). Mat data generator 38 also generates instructions which are sent as signal 7 to customer processing apparatus 2,4 defining the position on the photographic mat which the part of the subject object which is to appear in the first image of the resulting three-dimensional computer model should face. Images of the subject object on the photographic mat are then recorded by a camera 16 and returned to the processing apparatus 6 as signals 7 for processing. Mat data generator 38 stores in memory 32 data defining the pattern of features printed or displayed on the photographic mat for use by the processing apparatus 6 in calculating the positions and orientations at which the received images were recorded, and in controlling the first image to be displayed each time the three-dimensional computer model is accessed for viewing.

Camera position and orientation calculator 40 processes the received data defining a plurality of images of the subject object(s) and the printed or displayed photographic mat to calculate the position and orientation of the camera 16 when each image was recorded.

3D model data generator 42 processes the received data defining the images and the data defining the positions and orientations at which the images were recorded to generate data defining a 3D computer model of the object(s) in the images.

View parameter calculator 44 calculates viewing parameters defining how the 3D computer model generated by 3D model data generator 42 should be rendered to generate the first image each separate time the 3D model data is accessed for viewing. View parameter calculator 44 defines the viewing parameters using the coordinate system in which the calibration pattern imaged with the subject object is defined. More particularly, as will be explained below, view parameter calculator 44 defines the viewing parameters so that the first image is generated looking towards the front marker 170 and hence towards the part of the subject object which the user has placed to face the front marker 170.

Image controller 46 controls the viewing access to the data defining the three-dimensional computer model of the subject object in such a way that the first image displayed for each viewing access is an image showing the part of the subject object facing the front marker 170 on the photographic mat 24. More particularly, image controller 46 transmits the data defining the three-dimensional computer model, or a reduced form of the data, as signals 7 to a viewing apparatus connected to internet 8, together with the parameters defining the viewing conditions for the first image generated by view parameter calculator 44. Alternatively, if the remote viewing apparatus connected to internet 8 cannot receive and process 3D data to generate images, image controller 46 processes the data defining the 3D computer model to generate image data which is then transmitted as signals 7 to the remote viewing apparatus. In this case, image controller 46 generates the image data to be transmitted for the first image in accordance with the viewing parameters previously stored and calculated by view parameter calculator 44.

Figure 4A:
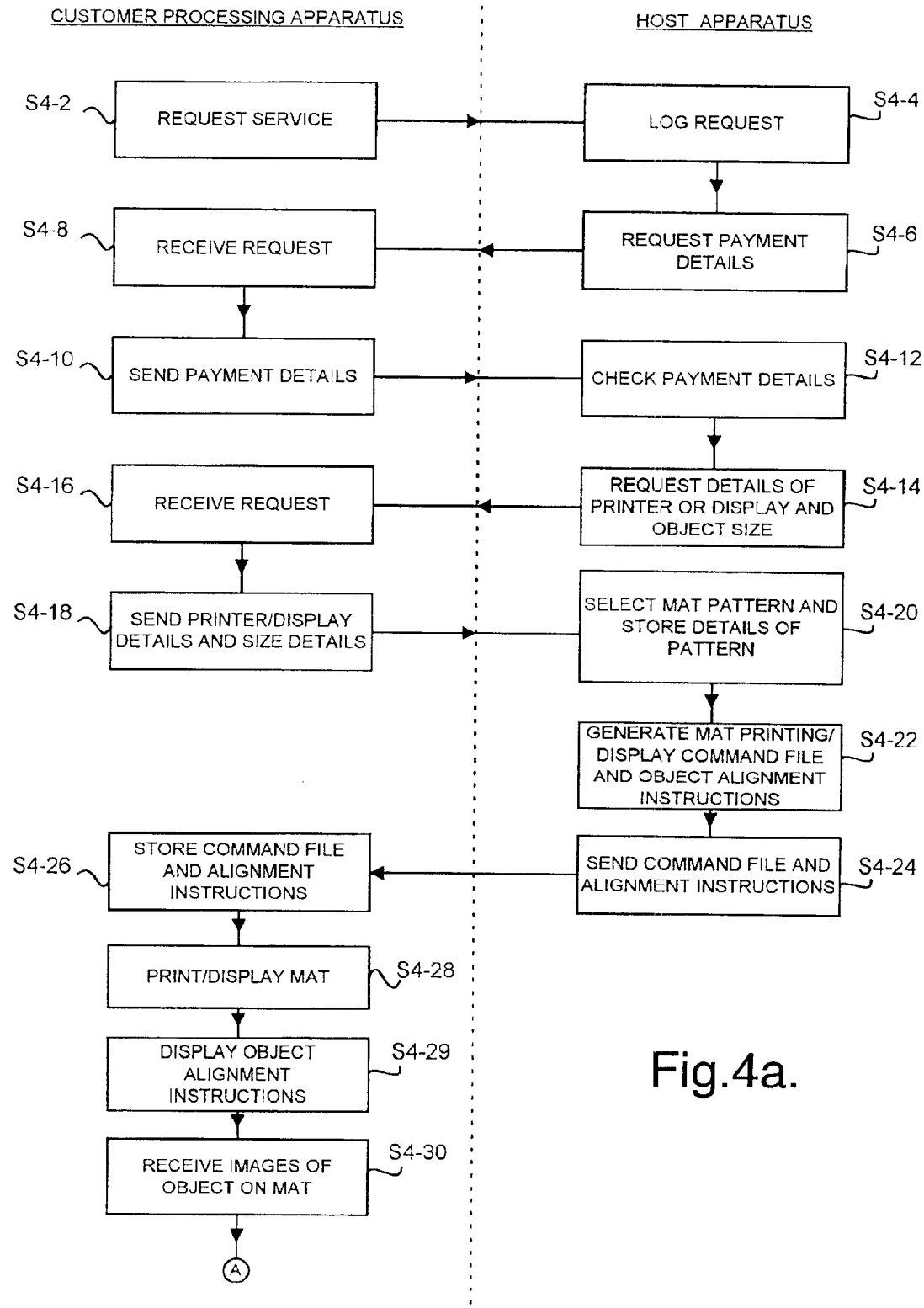
FIG. 4a and FIG. 4b show the processing operations performed by the apparatus in the system of FIG. 1 in the first embodiment to generate data defining a 3D computer model of an object.
Figure 4B:
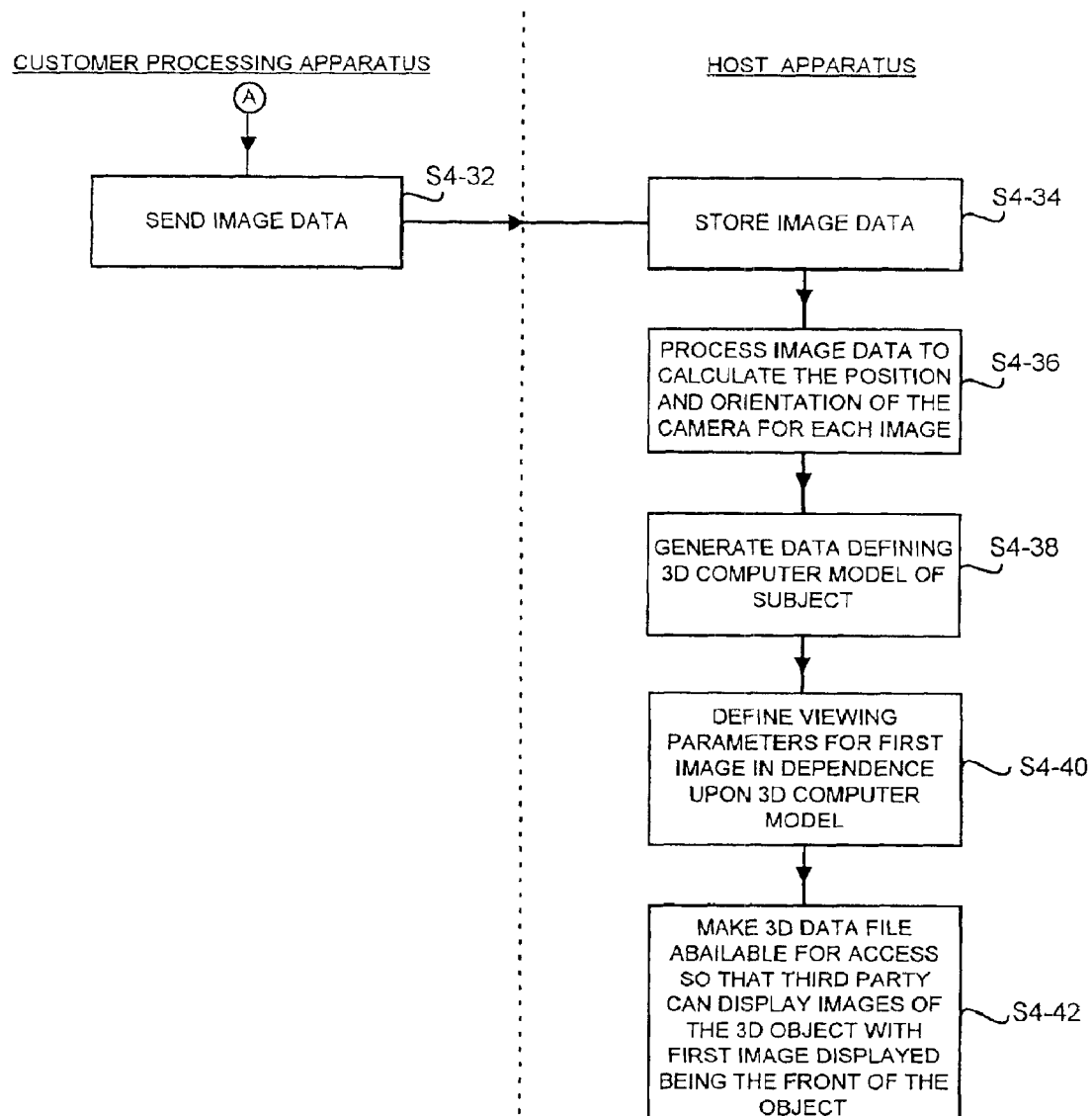

FIG. 4, comprising FIGS. 4a and 4b, shows the processing operations performed by processing apparatus 6 and one of the customer computer processing apparatus 2, 4 in this embodiment. Communication between the processing apparatus 6 and the customer computer processing apparatus is by the transmission of signals 7 over the communication network 8.

Referring to FIG. 4, at step S4-2, a customer processing apparatus 2, 4 transmits a request to processing apparatus 6 for a 3D modelling and auction service.

At step S4-4, payment controller 36 of processing apparatus 6 logs the request, and at step S4-6 transmits a signal to the customer processing apparatus requesting payment details, for example a credit card number or identification of an account which the customer holds with the operator of processing apparatus 6.

At step S4-8, the customer processing apparatus receives the payment request, and at step S4-10 sends the requested payment details.

At step S4-12, payment controller 36 in processing apparatus 6 receives the payment details sent by the customer processing apparatus and checks the details, for example to confirm the credit card payment with an authorisation agency or to check whether the customer's account is in credit.

It is determined at S4-12 that a satisfactory payment has been made, then, at step S4-14, mat data generator 38 requests data from the customer processing apparatus defining the type of printer 18 or display panel 19 which is to print or display the photographic mat, and also data defining the maximum width in any direction of the subject object to be placed on the photographic mat.

At step S4-16, the customer processing apparatus receives the request for printer/display details and object size, and at step S4-18, sends the requested details to the processing apparatus 6.

At step S4-20, mat data generator 38 selects at random a calibration pattern for the photographic mat from patterns prestored in calibration pattern store 37, and stores data in memory 32 defining which pattern has been selected.

In this embodiment, the features on the photographic mat are arranged around a blank central area (160 in FIG. 2) in which the subject object is to be placed. Mat data generator 38 selects the diameter of the central blank area to be larger than the maximum width of the object defined in the data received from the customer processing apparatus. In this way, the features on the photographic mat are positioned so that they will be visible when the subject object is placed on the mat.

At step S4-22, mat data generator 38 generates a command file for use by the customer processing apparatus to cause printer 18 to print a photographic mat having the pattern selected at step S4-20, or for use by processing apparatus 4 to cause display panel 19 to display a photographic mat with the pattern selected at step S4-20. More particularly, mat data generator 38 generates the command file in dependence upon the type of printer or display defined in the details received from the customer apparatus, so that the instructions in the command file are suitable for enabling the customer apparatus to control the printer or display panel connected to the customer processing apparatus. In addition, in this embodiment, at step S4-22, mat data generator 38 also generates instructions defining how the subject object should be aligned with the pattern on the photographic mat so that the desired part of the subject object appears in the first image each time the subsequently generated 3D computer model is viewed. More particularly, mat data generator 38 generates instructions telling the user to align the part of the subject object which is to appear in each first image so that it faces the front marker 170 on photographic mat 24.

At step S4-24, the command file and alignment instructions generated at step S4-22 are sent from processing apparatus 6 to the customer processing apparatus.

At step 4-26, the customer processing apparatus stores the received command file and alignment instructions sent from the processing apparatus 6, and at step S4-28, the customer processing apparatus uses the command file to print a photographic mat 24 using printer 18 or to display a photographic mat on display panel 19.

At step S4-29, the customer processing apparatus displays to the user on display 14 the alignment instructions sent from the processing apparatus 6 defining how the subject object should be positioned on the photographic mat.

Having printed or displayed the photographic mat, the subject object (or objects) for which a 3D computer model is to be generated, is placed in the blank centre portion of the photographic mat, so that the object is surrounded by the pattern of features on the mat.

Figure 5:
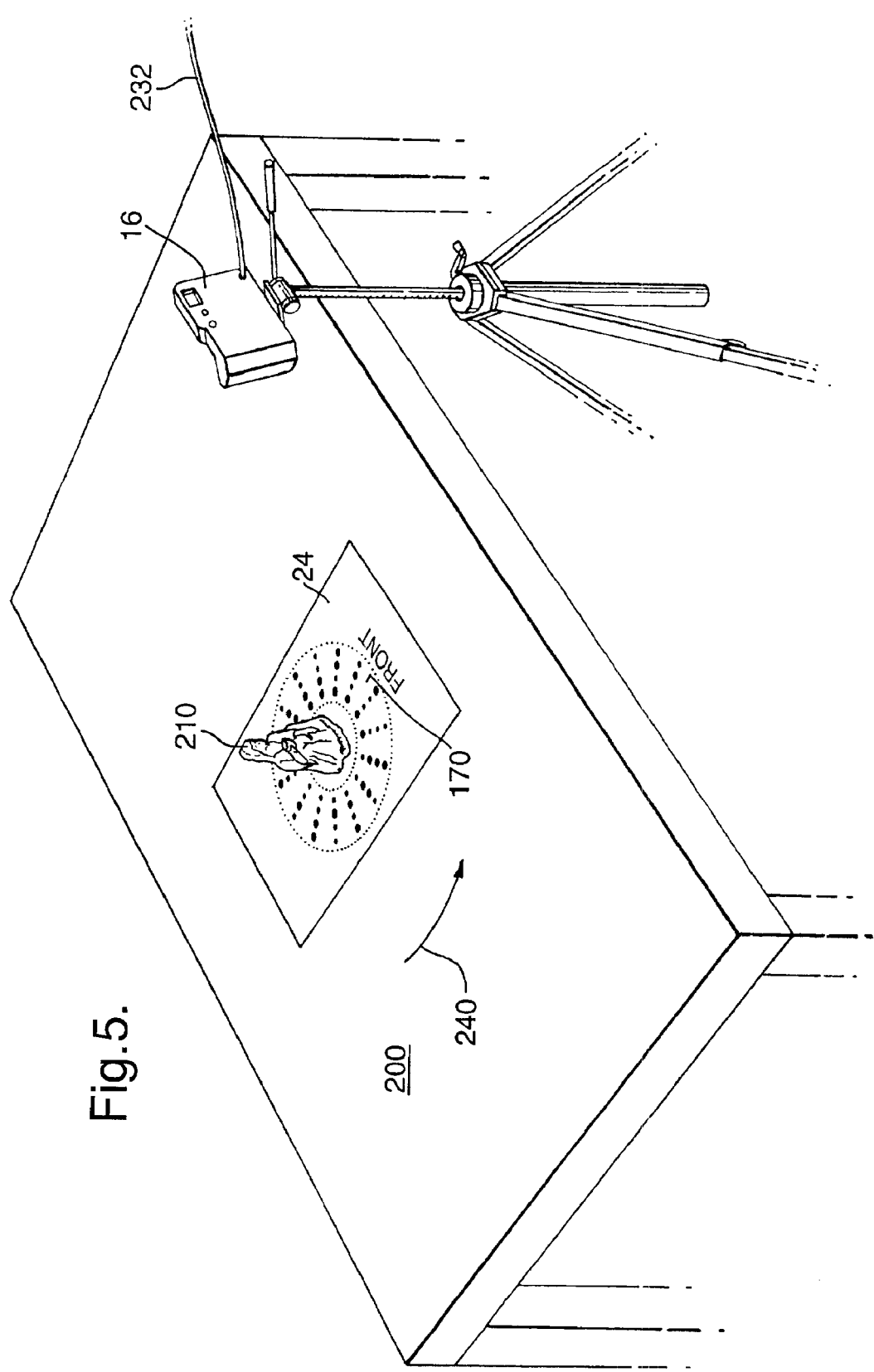
FIG. 5 illustrates the recording of images of an object for which a 3D computer model is to be generated.

Referring to FIG. 5, in the case where the photographic mat is printed, the printed photographic mat 24 is placed on a surface 200, and the subject object 210 for which a 3D computer model is to be generated is placed on the photographic mat 24 so that the object 210 is surrounded by the features making up the pattern on the mat, and so that the part of the subject object which the user wishes to appear in the first image each time the 3D computer model is viewed faces the front marker 170. In the example shown in FIG. 5, the front of the subject object 210 is positioned to face the front marker 170, although any desired part may be chosen to face the front marker 170.

Preferably, the surface 200 is of a substantially uniform colour, which, if possible, is different to any colour in the subject object 210 so that, in input images, image data relating to the subject object 210 can be accurately distinguished from other image data.

Images of the subject object 210 and photographic mat 24 are recorded at different positions and orientations to show different parts of object 210 using a digital camera 16. In this embodiment, data defining the images recorded by camera 16 is input to customer processing apparatus 2,4 as a signal along wire 232.

More particularly, in this embodiment, camera 16 remains in a fixed position and photographic mat 24 with subject object 210 thereon is moved (translated) and rotated (for example in the direction of arrow 240) on surface 200, and photographs of the subject object 210 at different positions and orientations relative to the camera 16 are recorded. During the rotation and translation of the photographic mat 24 on surface 200, the subject object 210 does not move relative to the mat 24.

Figure 6:
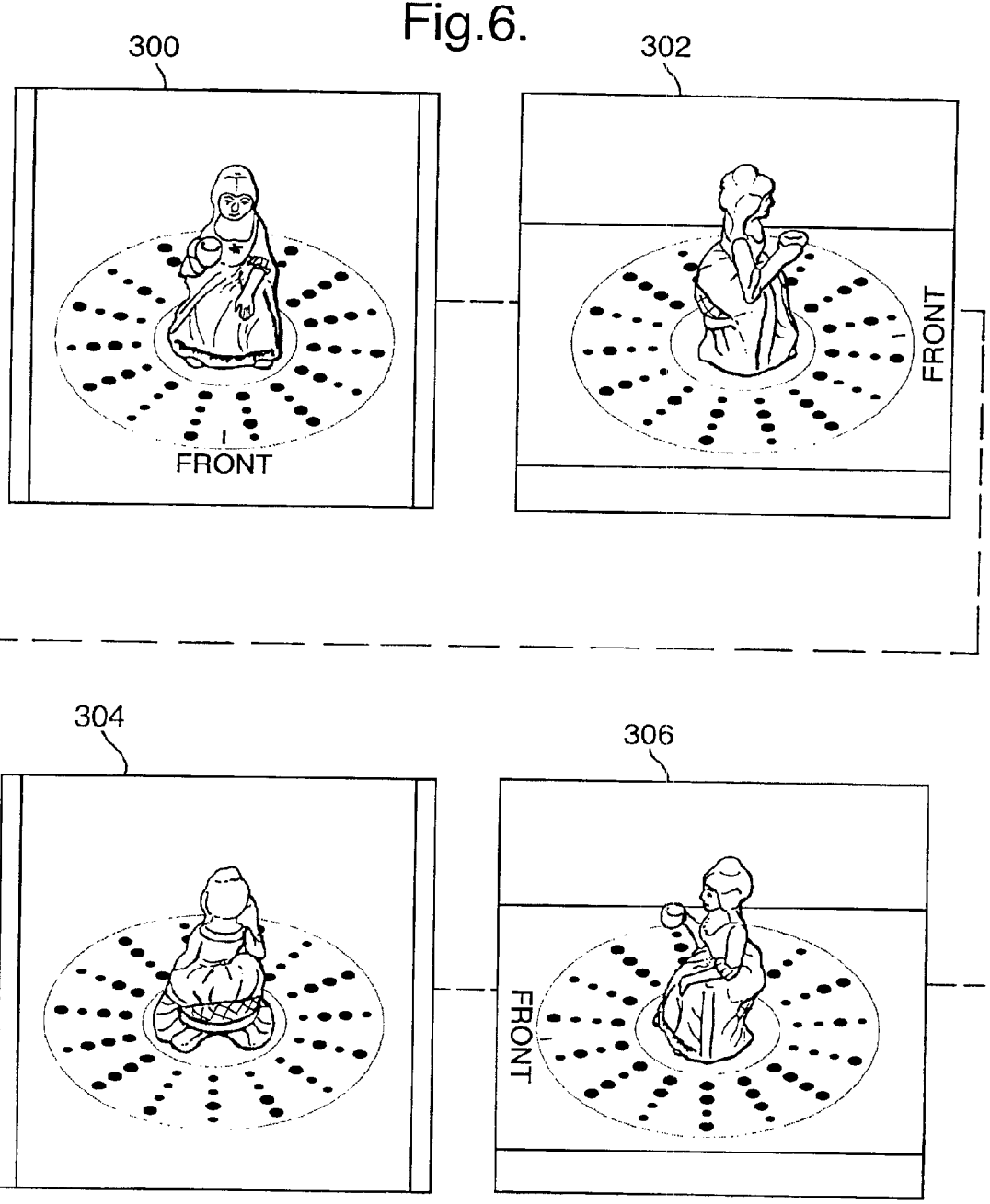

FIG. 6 shows examples of images 300, 302, 304 and 306 defined in data input to the customer processing apparatus of the subject object 210 and photographic mat 24 in different positions and orientations relative to camera 16.

Referring again to FIG. 4, at step S4-30, the customer processing apparatus receives data defining the recorded images from camera 16 showing the subject object on the photographic mat, and at step S4-32, sends the image data to the processing apparatus 6.

At step S4-34, processing apparatus 6 stores the image data received from the customer processing apparatus in memory 32, and at step S4-36, processes the image data to calculate the position and orientation of the camera 16 for each image.

More particularly, at step S4-36, camera position and orientation calculation 40 performs processing first to calculate the values of the intrinsic parameters of the camera 16 which recorded the images (that is, the aspect ratio, focal length, principal point, first order radial distortion coefficient and skew angle) in a conventional manner, for example as described in "Euclidean Reconstruction from Uncalibrated Views" by Hartley in Applications of Invariance in Computer Vision, Mundy Zisserman and Forsyth Eds at pages 237–256, Azores, 1993. Camera position and orientation calculator 40 then performs processing for each respective image to detect the features of the photographic mat in the image, to label the features (that is, to identify a one-to-one correspondence between each feature detected in the image and a feature of the photographic mat defined in the data previously stored at step S4-20), and to use the one-to-one correspondences to calculate the position and orientation at which the image was recorded. More particularly, in this embodiment, the processing to detect and label the features and to calculate the camera position and orientation is performed as described in copending PCT Patent Application GB00/004469 (WO-A-01-39124), "Automatic Reconstruction of 3D Objects Using a Mobile Camera" by Niem in Image and Vision Computing 17 (1999) pages 125–134, "The Lumigraph" by Gortler et al in Computer Graphics Proceedings, Annual Conference Series, 1996 ACM-0-89791-764-4/96/008, or JP-A-9-170914, depending upon the mat pattern selected at step S4-20.

At step S4-38, 3D model data generator 42 in processing apparatus 6 performs processing using the image data previously stored at step 4-34 and the position and orientation of each image calculated at step S4-36 to generate data defining a computer model of the 3D surface of the subject object and to generate texture data for the surface model. This processing is performed using one of the techniques described in copending PCT Patent Application GB00/00469 (WO-A-01-39124). "Automatic Reconstruction of 3D Objects Using a Mobile Camera" by Niem in Image and Vision Computing 17 (1999) pages 125–134, "The Lumigraph" by Gortler et al in Computer Graphics Proceedings, Annual Conference Series, 1996 ACM-0-89791-764-4/96/008, or JP-A-9-170914.

At step S4-40, view parameter calculator 44 calculates viewing parameters defining how the first image should be generated each time the 3D computer model generated at step S4-38 is viewed.

More particularly, at step S4-40, view parameter calculator 44 generates data defining a perspective camera and data defining the position and orientation of the camera so that the camera looks in a horizontal direction (that is, parallel to the y axis) in the negative y direction at the approximate centre of the object. In this way, the object is substantially centred in the image and the image shows the part of the subject object arranged to face the front marker 170 on the photographic mat. In addition, in this embodiment, view parameter calculator 44 calculates the viewing parameters to ensure that a bounding sphere for the 3D computer model is visible in the image so that, should the user subsequently rotate the object, it is always within the image view.

In this embodiment, view parameter calculator 44 defines the viewing parameters using OpenGL graphics calls, so that the 3D computer model can be viewed using an OpenGL browser.

Figure 7:
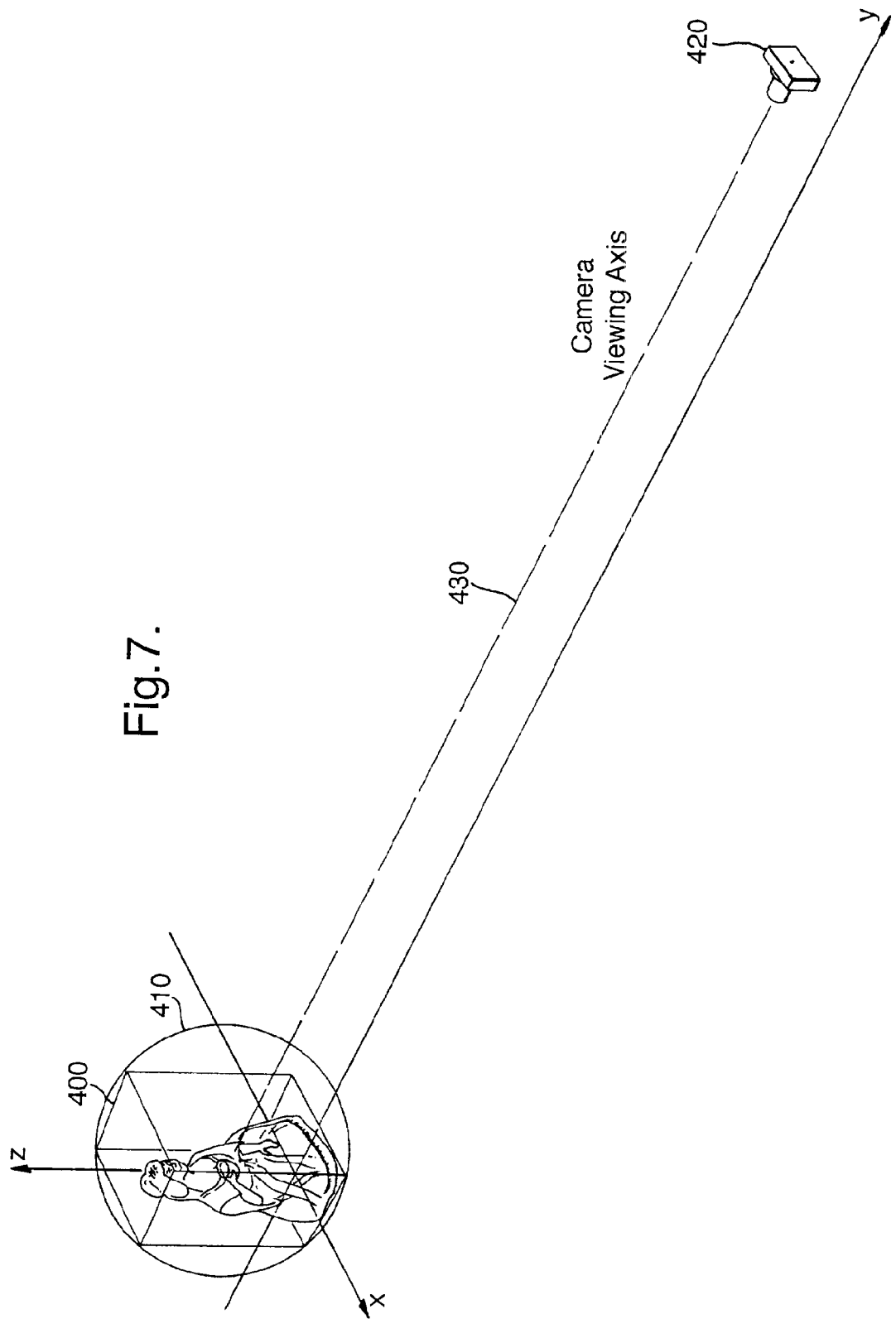
FIG. 7 illustrates how a viewing camera for the 3D computer model is defined at step S4-40 in FIG. 4b.

More particularly, view parameter calculator 44 defines the viewing parameters as set out below and as illustrated in FIG. 7, where the OpenGL graphics calls have a conventional meaning, for example as described in "OpenGL Programming Guide Second Edition: The Official Guide to Learning OpenGL Version 1.1" by Woo, Neider and Davis, Addison-Wesley, ISBN 0201461382.

Inputs:
The bounding box (400 in FIG. 7) of the surface polygons making up the 3D computer model of the subject object generated at step S4-38, so that the minimum and maximum values of the polygons are known along each of the x, y and z axes (minX, maxX, minY, maxY, minZ, maxZ) are known.

Defining parameters:
float midX=(maxX+minX)/2;
float midY=(maxY+minY)/2;
float midZ=(maxZ+minZ)/2;
float rX=(maxX−minX)/2;
float rY=(maxY−minY)/2;
float rZ=(maxZ−minZ)/2;

Defining the radius of a bounding sphere (410 in FIG. 7) around the bounding box bounding the polygons making up the 3D computer model:
float radius=sqrt(*rX\*rX+rY\*rY+rZ\*rZ*);

Defining an identity perspective projection matrix:
glMatrixMode(GL_PROJECTION);
glLoadIdentity( );

Defining the view range of the camera:
float view_range=20.0;

Defining a perspective camera:
gluPerspective(90*(radius/view_range),
viewer.Width( )/viewer.Height( ), 0.5, 25);

where:
90* (radius/view_range) defines the angle of the field of view.
viewer.Width ( )/viewer.Height ( ) defines the aspect ratio of the width to height of the image. In this embodiment, the values of viewer.Width ( ) and viewer.Height ( ) are set so that the sphere (410 in FIG. 7) bounding the bounding box is within the values. This ensures that the bounding sphere is visible in the image.

The values 0.5 and 25 define the distance between the viewpoint and the near and far clipping planes of the pyramid defined by the field of view angle and aspect ratio.

Positioning the camera to look along the y-axis:

gluLookAt(midX, midY+view_range, midZ,
midX, midY, midZ, 0, 0, 1)

where:

the first three parameters midX, midY+view_range and midZ define the viewpoint position of the camera. Thus, the camera is positioned a distance view_range from the centre of the bounding sphere (410 in FIG. 7) in a horizontal direction parallel to the y-axis;

the next three parameters midX, midY and midZ specify a point along the desired line of sight. Thus, the camera is orientated to look at the centre of the bounding sphere;

the final three parameters 0, 0 and 1 indicate which direction is up in the coordinate system being used (that is, the z direction in this embodiment).

In summary, referring to FIG. 7, the viewing camera 420 is positioned a distance "view_range" from the centre of the bounding sphere 410 in a horizontal direction parallel to the y-axis, and is orientated so that its viewing axis 430 is parallel to the y-axis and intersects the centre of the bounding sphere 410. In this way, because the centre of the bounding sphere 410 defines approximately the centre of the computer model of the subject object, the viewing camera 420 is positioned and orientated so that the approximate centre of the subject object will appear in the centre of an image generated by the camera.

Referring again to FIG. 4, at step S4-42, the data defining the 3D computer model of the subject object generated at step S4-38 is made available for access by other apparatus via the Internet 8 in a conventional manner, together with the viewing parameters defined at step S4-40.

Alternatively, data defining the 3D computer model generated at step S4-38 and data defining the viewing parameters generated at step S4-40 may be sent from processing apparatus 6 to a customer processing apparatus 2,4, with the customer processing apparatus 2,4 then making the data available for access by other apparatus via the Internet 8 in a conventional manner.

Figure 8:
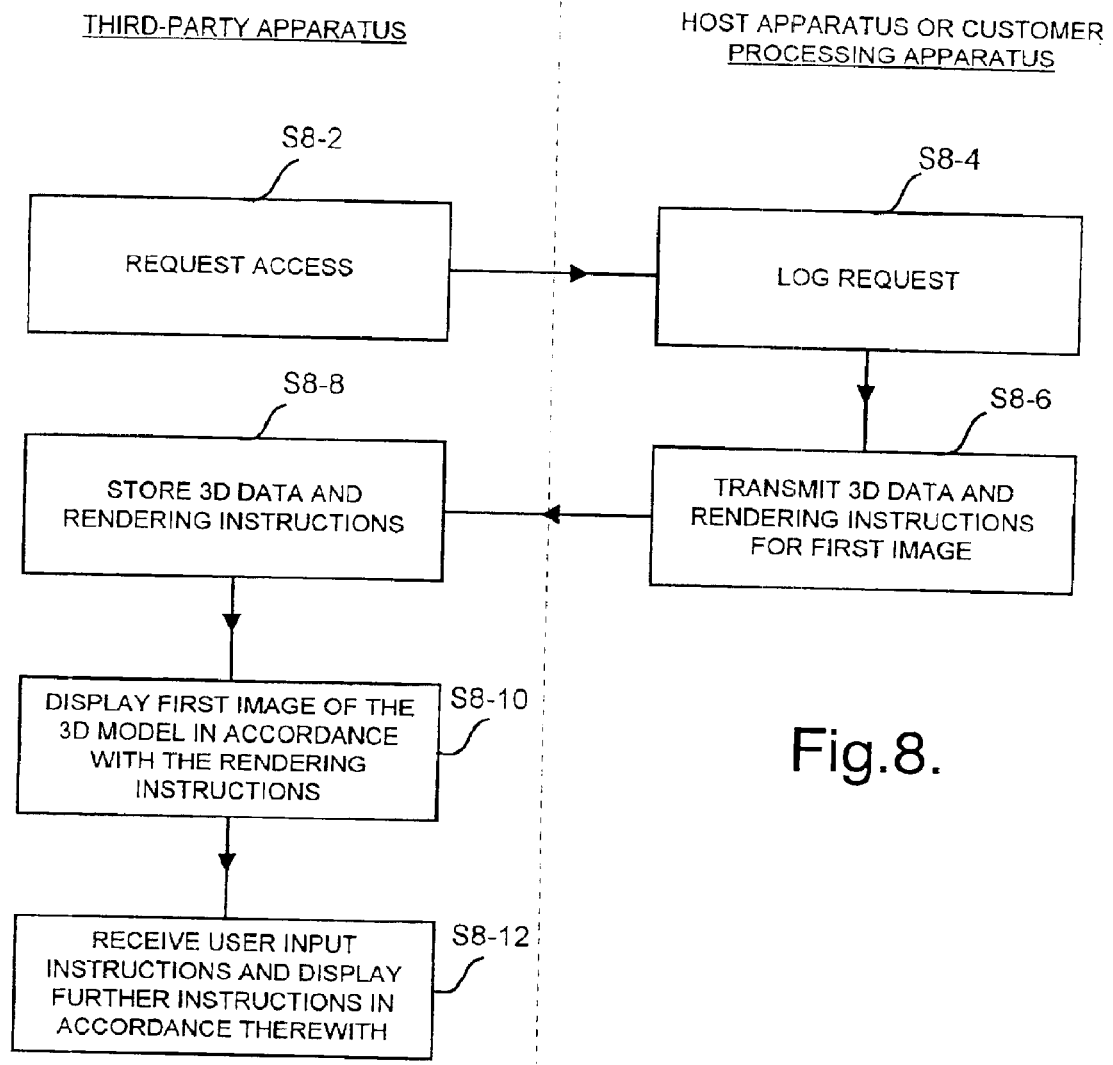
FIG. 8 shows the processing operations performed to display images of the 3D computer model in the first embodiment where 3D data is sent to the viewing apparatus and the viewing apparatus processes the 3D data to generate image data.

FIG. 8 shows the processing operations performed in this embodiment when the data defining the 3D computer model stored on processing apparatus 6 or a customer processing apparatus 2,4 is sent to a third-party apparatus (not shown) so that the user of the third-party apparatus can view images of the 3D computer model.

Referring to FIG. 8, at step S8-2, the third-party apparatus transmits a signal to the processing apparatus storing the data defining the 3D computer model (that is, processing apparatus 2, 4 or 6) requesting access to view the 3D computer model.

At step S8-4, the processing apparatus storing the data defining the 3D computer model logs the request from the third-party apparatus, and at step S8-6 transmits the data defining the three-dimensional computer model, or a reduced form of the data, to the third-party apparatus making the request, together with rendering instructions defining how the third-party apparatus should render the 3D computer model to generate the first image thereof. In this embodiment, the rendering instructions transmitted by image controller 46 at step S8-6 comprise the OpenGL graphics calls gluPerspective and gluLookAt previously generated by view parameter calculator 44 at step S4-40.

At step S8-8, the third-party apparatus stores the 3D data and rendering instructions received from the processing apparatus 2, 4 or 6.

At step S8-10, the third-party apparatus generates and displays an image of the 3D computer model in accordance with the received rendering instructions, that is by rendering the received 3D computer model data in accordance with the received parameters defining the viewing camera. In this way, the first image generated and displayed by the third-party apparatus comprises an image of the part of the subject object which was positioned by the user of customer processing apparatus 2,4 to face the front marker 170 on the photographic mat 24. Accordingly, the user of the customer processing apparatus 2,4 has controlled the content of the first image of the 3D computer model displayed at the third-party apparatus.

At step S8-12, the third-party apparatus receives user input instructions defining changes in the position and orientation of the subject object in the 3D computer model and/or changes in the viewing parameters for the camera viewing the 3D computer model, and generates and displays image data in accordance with these instructions, in a convention manner.

Figure 9:
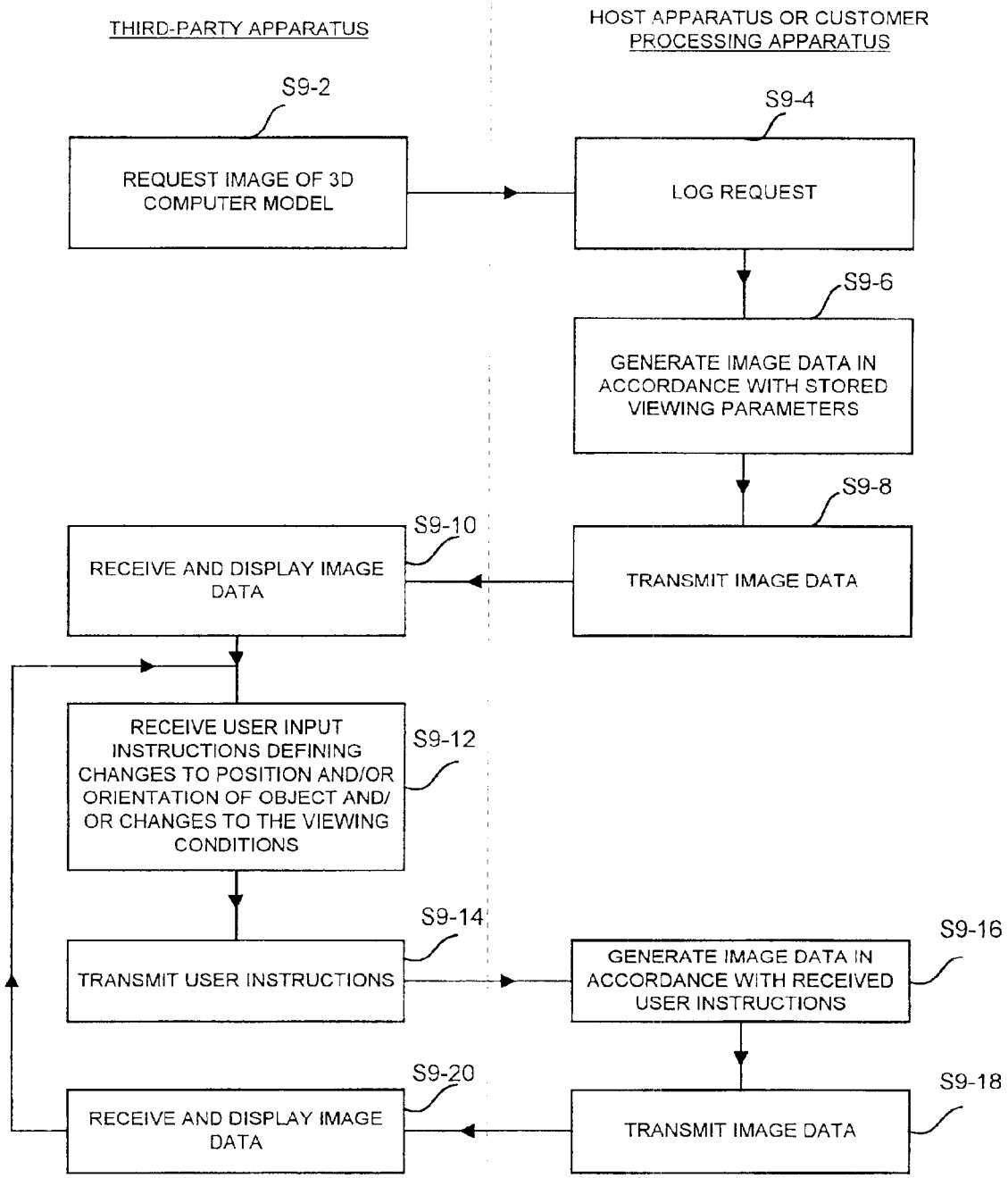
FIG. 9 shows the processing operations performed to display images of the 3D computer model in the first embodiment where the 3D data is processed by the apparatus storing the data and image data is sent to the viewing apparatus.

FIG. 9 shows the processing operations performed in this embodiment when a third-party apparatus wishes to view the 3D computer model of the subject object stored on processing apparatus 2,4 or 6 but the third-party apparatus cannot perform processing to receive and process data defining the 3D computer model.

Referring to FIG. 9, at step S9-2, the third-party apparatus sends a signal to the processing apparatus 2,4 or 6 storing the data defining the 3D computer model requesting an image of the 3D computer model.

At step S9-4, the processing apparatus 2, 4 or 6 storing the data defining the 3D computer model logs the request from the third-party apparatus.

At step S9-6, image data for transmission to the third-party apparatus is generated by rendering the 3D computer model in accordance with the viewing parameters previously generated by view parameter calculator 44 at step S4-40. In this way, the image generated shows the part of the subject object previously arranged by the user at the customer processing apparatus 2,4 to face the front marker 170 on the photographic mat. Consequently, the content of the first image is determined by the user at the customer processing apparatus 2,4 (more particularly, by the way the user arranges the subject object relative to the pattern of features on the photographic mat).

At step S9-8, the image data generated at step S9-6 is transmitted to the third-party apparatus, and at step S9-10, the third-party apparatus receives and displays the image data.

At step S9-12, the third-party processing apparatus receives instructions input by the user thereof defining changes to the position and/or orientation of the object and/or changes to the viewing conditions (the position, orientation, zoom of the viewing camera), and at step S9-14 transmits the user instructions to the processing apparatus 2,4 or 6 storing the data defining the 3D computer model.

At step S9-16, the processing apparatus 2, 4 or 6 storing the data defining the 3D computer model generates data defining a further image by rendering the 3D computer model in accordance with the received user instructions.

At step S9-18, the image data generated at step S9-16 is transmitted to the third-party apparatus, and at step S9-20, the third-party apparatus receives and displays the image data.

Steps S9-12 to S9-20 are repeated as the user inputs further instructions to view the 3D computer model under different conditions.

In the first embodiment described above, at step S4-40, view parameter calculator 44 generates data defining a viewing camera for the 3D computer model so that each time the 3D computer model is viewed, the first image is generated by rendering the 3D computer model using the defined camera.

However, view parameter calculator 44 and the processing at step S4-40 may be omitted while still allowing the user at a customer processing apparatus 2,4 to align the subject object 210 with the front marker 170 on the photographic mat so that the part of the subject object 210 facing the front marker 170 appears in the first image each time the 3D computer model is viewed. This will be explained below in detail in the second embodiment.

Second Embodiment

The components of the second embodiment and the processing operations performed by the components are the same as those in the first embodiment, with the exception that view parameter calculator 44 and the processing at step S4-40 is omitted, and each calibration pattern in calibration pattern store 37 is defined in a coordinate system in a different way to that shown in FIG. 3 in the first embodiment. In addition, in steps S8-6 to S8-10 and step S9-6, the first image is generated in accordance with a predetermined camera and not in accordance with generated viewing parameters. These differences will be explained in detail below.

Many standards, including OpenGL, define a default camera in accordance with which a 3D computer model is to be rendered if no other viewing camera is defined. Accordingly, in the second embodiment, each calibration pattern stored in calibration pattern store 37 is defined in a coordinate system taking into account the default camera such that the default camera will produce an image of the subject object looking towards the front marker 170 on the photographic mat and consequently towards the part of the subject object which the user at customer processing apparatus 2,4 positions so as to face the front marker 170.

Figure 10:
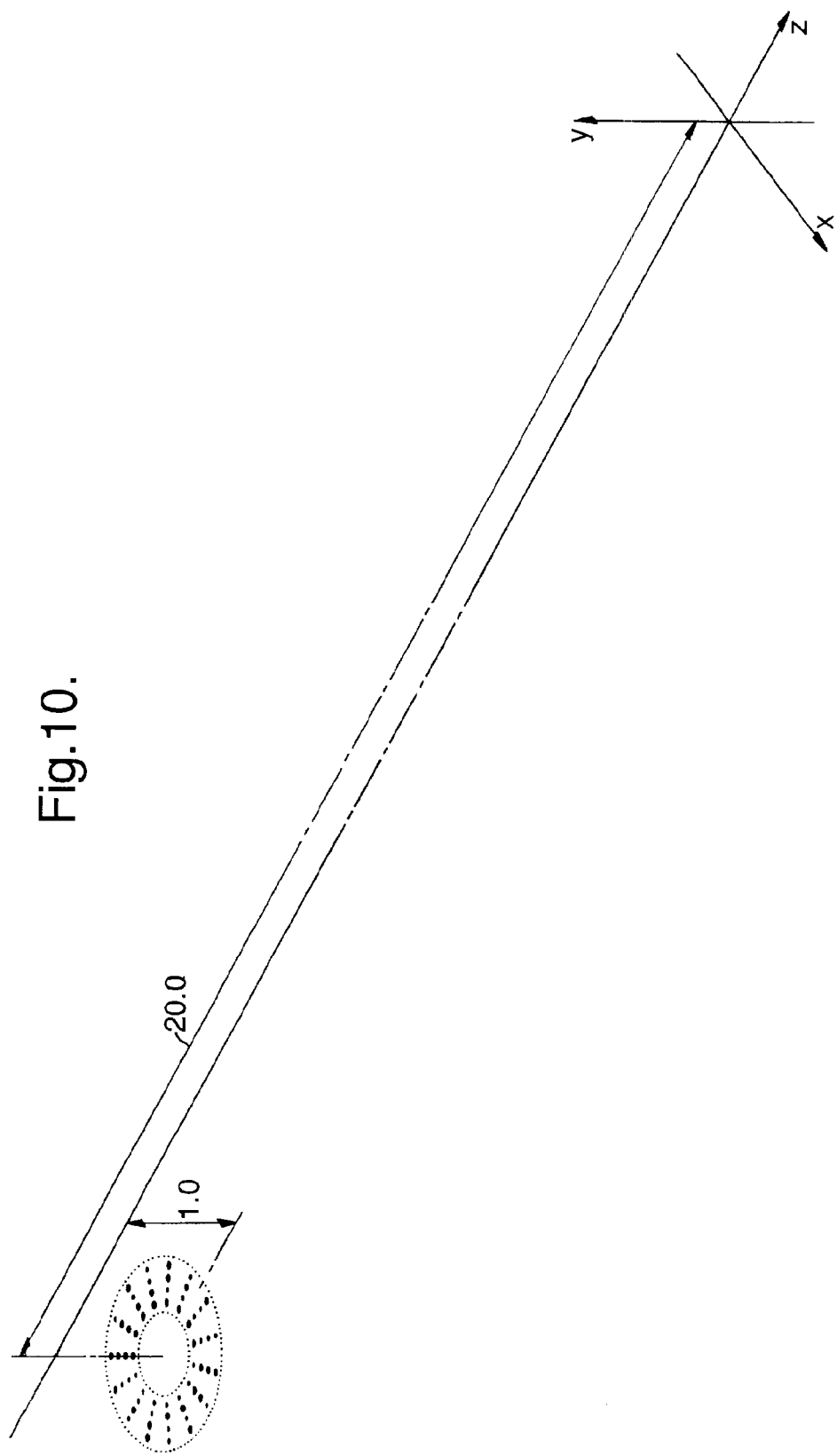
FIG. 10 illustrates how the features in the pattern shown in FIG. 2 are defined in a coordinate system in a second embodiment.

More particularly, FIG. 10 illustrates how the features in the calibration pattern shown in FIG. 2 are defined in a coordinate system in the second embodiment for the default camera in the OpenGL standard. Other calibration patterns in calibration pattern store 37 are defined in a corresponding way.

The default camera in the OpenGL standard is positioned at the origin of a cartesian x, y, x coordinate system with the positive y-axis straight up and the camera looking down the negative z-axis.

Accordingly, referring to FIG. 10, in the second embodiment, each calibration pattern stored in calibration pattern store 37 is defined so that the centre of the pattern (which defines the approximate position on the photographic mat at which the user will place the centre of the base of the subject object 210 for imaging) is at a coordinate (0.0, −1.0, −20.0) and the front edge of the front marker 170 is at a coordinate (0, −1.0, −19.0) (since the radius of the calibration pattern is one unit as in the first embodiment). In this way, the front marker 170 is aligned with the z-axis of the coordinate system and the plane in which the calibration pattern lies is a distance of one unit below the z-axis. The distance of one unit below the z-axis is set in this embodiment because it has been found in practice that the typical height of a subject object 210 placed on the photographic mat for imaging is twice the radius of the calibration pattern on the photographic mat (that is, the height is typically two units in the coordinate system).

Accordingly, when a subject object 210 is placed on the photographic mat for imaging, the negative z-axis of the coordinate system (which defines the view direction of the viewing camera) will intersect the approximate centre of the subject object 210. In addition, the part of the subject object 210 arranged by the user to face the front marker 170 will appear in each image generated using the default viewing camera.

Referring again to FIG. 8, in the second embodiment, at steps S8-6 to S8-10, rendering instructions for the first image are not generated and sent to the third-party apparatus. Accordingly, because no viewing camera is defined in the instructions, the third-party apparatus generates the first image of the 3D computer model in accordance with the default viewing camera.

Similarly, at step S9-6 in FIG. 9, the image data is generated in accordance with the default viewing camera.

Consequently, the user can determine the content of the image generated by the default camera each time the 3D computer model of the subject object is accessed by orientating the subject 210 on the photographic mat relative to the front marker 170.

As an alternative to the processing described above, rather than defining the y coordinate of each calibration pattern in dependence upon the expected height of the subject object (that is, the y coordinate of the plane in which each calibration pattern lies is defined to be −1.0 of the processing above), the 3D computer model of the subject object may be generated relative to a calibration pattern lying in a plane having a predetermined y coordinate of, say, 0.0 (so that the centre of the calibration pattern is at a coordinate position of (0.0, 0.0, −20.0)), and the generated 3D computer model may then be re-positioned in the coordinate system to move it in the negative y-axis direction by a predetermined amount equal to half of the expected height of the subject object. Thus, for example, if the y coordinate of the calibration pattern plane is 0.0, then the 3D computer model would be re-positioned in the negative y-axis direction by 1.0 units. This achieves the same result of ensuring that the viewing axis of the default camera intersects the approximate centre of the 3D computer model.

Alternatively, the 3D computer model of the subject object may be generated relative to a calibration pattern lying in a plane having a predetermined y coordinate of, say, 0.0 but with an off-set in the y coordinate of each polygon vertex in the 3D computer model equal to minus one half of the expected height of the subject object (for example −1.0 units). In this way, the 3D computer model is not generated and then subsequently repositioned, but is generated in the desired position relative to the default viewing camera straight away by incorporating the off-set into the y coordinate of each polygon of the model when it is generated.

Third Embodiment

A third embodiment of the invention will now be described.

The components of the third embodiment and the processing operations performed by the components are the same as those in the first embodiment, with the exception of the processing performed at steps S4-14, S4-18 and S4-40. These differences will be explained in detail below.

In the third embodiment, at step S4-14, as well as generating data requesting information from the customer processing apparatus defining the type of printer 18 or display panel 19 and data defining the maximum width of the subject object 210, mat data generator 38 also generates data requesting the customer processing apparatus to send data defining the height of the subject object 210.

Accordingly, at step S4-18 in the third embodiment, the customer processing apparatus transmits a signal 7 to processing apparatus 6 defining the requested printer/display details, maximum width of the subject object 210 and also the height of the subject object 210.

In the processing at step S4-40 in the third embodiment, rather than defining a viewing camera in dependence upon the generated three-dimensional computer model (as in the first embodiment), view parameter calculator 44 generates data defining a perspective camera as in the first embodiment, but then positions the camera at a position having an x coordinate of 0, a y coordinate of +20, and a z coordinate equal to half of the height of the subject object defined in the data sent by the customer processing apparatus at step S4-18. The viewing direction of the camera is defined to be parallel to the y axis in the negative y-axis direction.

In this way, the viewing axis of the virtual viewing camera will still intersect the approximate centre of the 3D computer model of the subject object 210 because the subject object 210 will be substantially centred on the photographic mat relative to the calibration pattern when the initial images are recorded by camera 16 (and hence the centre of the base of the subsequently generated 3D computer model will be approximately at the origin of the modelling coordinate system) and because the height of the virtual viewing camera for the 3D computer model (that is its height above the y-axis in the coordinate system) is set to be half of the subject object height.

Fourth Embodiment

A fourth embodiment of the present invention will now be described.

The components of the fourth embodiment and the processing operations performed by the components are the same as those in the second embodiment, with the exception that, in the 3D coordinate system in which each calibration pattern is defined and in which the 3D computer model is generated, the y coordinate of the plane in which the calibration pattern lies is not fixed at −1.0 (that is, one unit below the z-axis) but instead is set in dependence upon the height of the subject object 210.

More particularly, in the fourth embodiment, at step S4-14, as well as generating data requesting information from the customer processing apparatus defining the type of printer 18 or display panel 19 and data defining the maximum width of the subject object 210, mat data generator 38 also generates data requesting the customer processing apparatus to send data defining the height of the subject object 210.

Accordingly, at step S4-18 in the third embodiment, the customer processing apparatus transmits a signal 7 to processing apparatus 6 defining the requested printer/display details, maximum width of the subject object 210 and also the height of the subject object 210.

Upon receipt of the data defining the height of the subject object 210, processing apparatus 6 performs an additional processing step in the third embodiment to set the y coordinate of the plane in which the calibration pattern lies to be minus one half of the height of the subject object 210.

Thus, for example, each calibration pattern in calibration pattern 37 may be stored in a plane having a y coordinate of 0.0, and the calibration pattern selected at step S4-20 may then be repositioned in the coordinate system to a plane having a y coordinate of minus one half of the height of the subject object 210.

Consequently, in subsequent processing, the 3D computer model of the subject object is generated relative to the re-positioned calibration pattern in the coordinate system and accordingly the viewing axis of the default viewing camera intersects the approximate centre of the 3D computer model.

As an alternative to the processing described above, rather than re-positioning the calibration pattern in the coordinate system in dependence upon the height of the subject object, the 3D computer model of the subject object may be generated relative to a calibration pattern lying in a plane having a predetermined y coordinate of, say, 0.0, and the generated 3D computer model may then be re-positioned in the coordinate system to move it in the negative y-axis direction by one half of the height of the subject object defined in the data received from the customer processing apparatus. This achieves the same result of ensuring that the viewing axis of the default camera intersects the approximate centre of the 3D computer model.

Alternatively, the 3D computer model of the subject object may be generated relative to a calibration pattern lying in a plane having a predetermined y coordinate of, say, 0.0 but with an offset in the y coordinate of each polygon vertex in the 3D computer model equal to minus one half of the height of the subject object defined in the data received from the customer processing. In this way, the 3D computer model is not generated and then subsequently re-positioned, but is generated in the desired position relative to the default viewing camera straight away by incorporating the off-set into the y coordinate of each polygon of the model when it is generated.

Fifth Embodiment

A fifth embodiment of the present invention will now be described.

The components of the fifth embodiment and the processing operations performed by the components are the same as those in the first embodiment, with the exception of the processing performed by view parameter calculator 44 at step S4-40.

More particularly, in the fifth embodiment, in the processing at step S4-40, rather than defining a viewing camera in dependence upon the generated three-dimensional computer model (as in the first embodiment) or in dependence upon data from a customer processing apparatus 2, 4 defining the height of the subject object (as in the third embodiment), view parameter calculator 44 generates data defining a perspective camera as in the first embodiment, but then positions the camera at a predetermined position of (20.0, 0.0, 1.0), with the viewing direction of the camera defined to be parallel to the y-axis in the negative y-axis direction. That is, the z coordinate of the viewing camera position is defined to be one half of the height which has been found in practice to be typical of a subject object 210 placed on the photographic mat for imaging (that is, the typical height has been found to be twice the radius of the calibration pattern on the photographic mat).

In this way, the viewing axis of the virtual viewing camera will still intersect the approximate centre of the 3D computer model of the subject object. This is because the subject object 210 will be substantially centred on the photographic mat relative to the calibration pattern when the initial images are recorded by camera 16 (and hence the centre of the base of the subsequently generated 3D computer model will be approximately at the origin of the modelling coordinate system) and because the height of the virtual viewing camera for the 3D computer model (that is the z coordinate of the camera position) is set to be half of the expected 3D computer model height.

Sixth Embodiment

A sixth embodiment of the present invention will now be described.

The components of the sixth embodiment and the processing operations performed by the components are the same as those in the second embodiment, with the exception that, after the 3D computer model of the subject object has been generated at step S4-38, the 3D computer model is re-positioned relative to the default viewing camera so that the viewing axis of the default viewing camera more accurately intersects the approximate centre of the 3D computer model.

More particularly, in the sixth embodiment, after the 3D computer model has been generated at step S4-38, processing is performed in the same way as in the first embodiment to define a bounding box around the polygons making up the 3D computer model and then to define a bounding sphere around the bounding box.

The 3D computer model is then moved so that the viewing axis of the default viewing camera intersects the centre of the bounding sphere.

Consequently, by moving the 3D computer model in dependence upon its extents in the x, y and z direction, the 3D computer model can be more accurately positioned at the centre of the field view of the default viewing camera.

In all of the embodiments described above, the first image of the 3D computer model of the subject object displayed at the third party apparatus comprises image data generated by rendering the 3D computer model with a virtual viewing camera.

However, the first image displayed at the third party apparatus may comprise an image recorded by the user at customer processing apparatus 2, 4 using camera 16.

This will be explained in more detail below in the seventh and eighth embodiments.

Seventh Embodiment

A seventh embodiment of the present invention will now be described.

The components of the seventh embodiment and the processing operations performed by the components are the same as those in any of the embodiments described above, with the exception of the processing performed at step S4-40 and step S4-42 (or step S4-42 alone in the case of embodiments in which step S4-40 is not performed).

Figure 11:
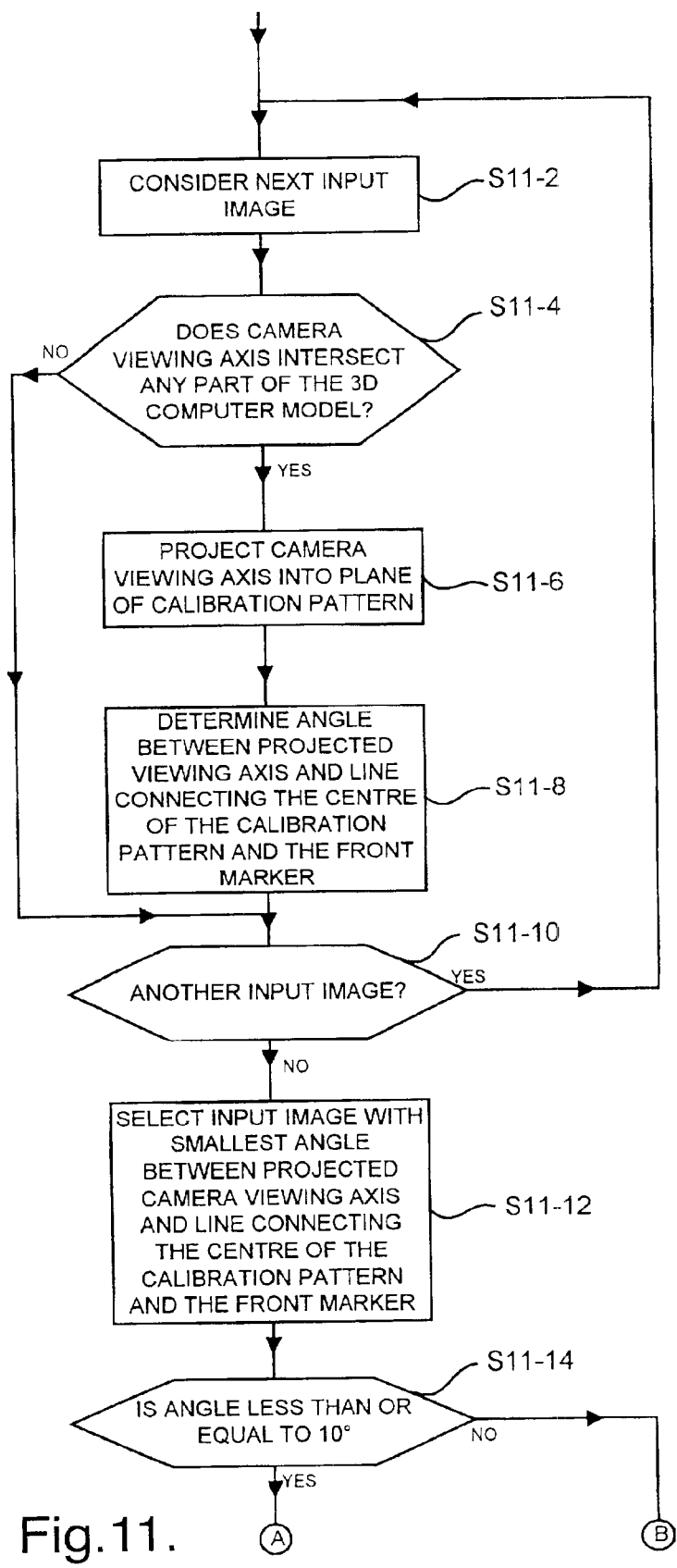
FIG. 11 shows processing operations performed in a seventh embodiment.
Figure 11:
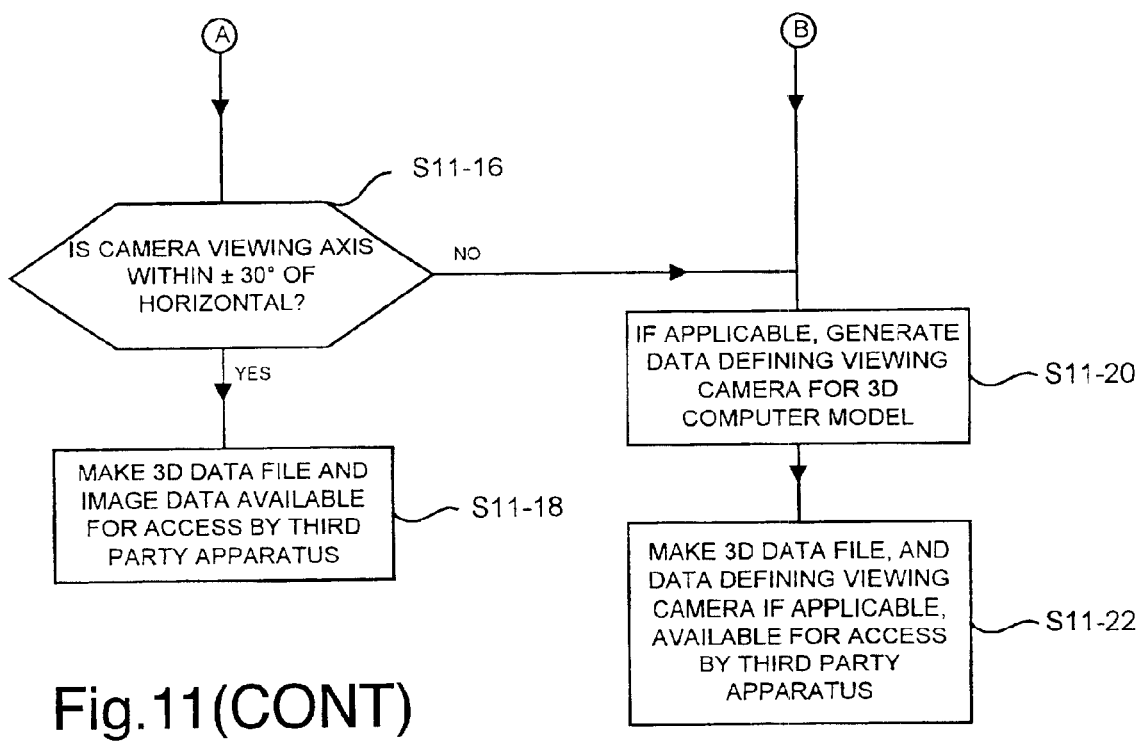

More particularly, in the seventh embodiment, the processing at steps S4-40 and S4-42 is replaced by the processing steps shown in FIG. 11.

Referring to FIG. 11, at step S11-2, processing apparatus 6 considers the next input image previously received from customer processing apparatus 2, 4 and stored at step S4-34 for which the camera imagining position and orientation was calculated at step S4-36.

Figure 12A:
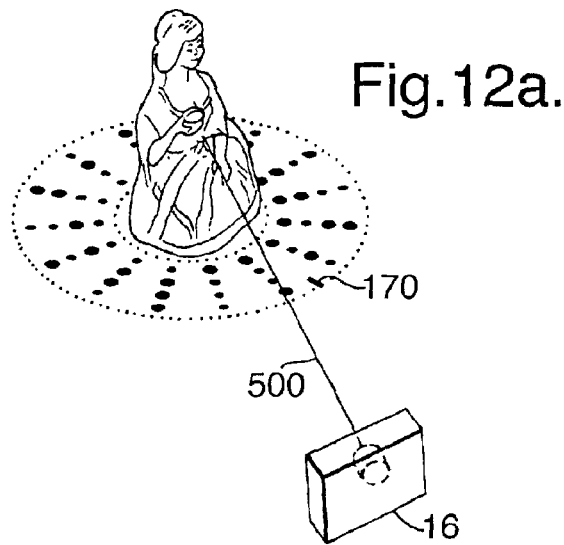
FIG. 12 shows the processing operations performed at steps S11-6 and S11-8 in FIG. 11.

Referring to FIG. 12a, because the recording position and orientation of each input image received from customer processing apparatus 2, 4 has been calculated by processing apparatus 6 at step S4-36, the camera viewing axis 500 for each input image is defined relative to the calibration pattern and 3D computer model in the coordinate system in which the calibration pattern and 3D computer model are defined.

At step S11-4, processing apparatus 6 determines whether the camera viewing axis of the image currently being considered intersects the 3D computer model generated at step S4-38.

If it is determined at step S11-4 that the camera viewing axis does not intersect the 3D computer model, then processing proceeds to step S11-10 to consider the next input image.

On the other hand, if it is determined at step S11-4 that the camera viewing axis does intersect the 3D computer model, then, at step S11-6, processing apparatus 6 projects the camera viewing axis into the plane of the calibration pattern in the 3D coordinate system in which the calibration pattern and 3D computer model are defined.

At step S11-8, processing apparatus 6 determines the angle between the projected camera viewing axis and the line connecting the centre of the calibration pattern and the front marker 170.

Figure 12B:
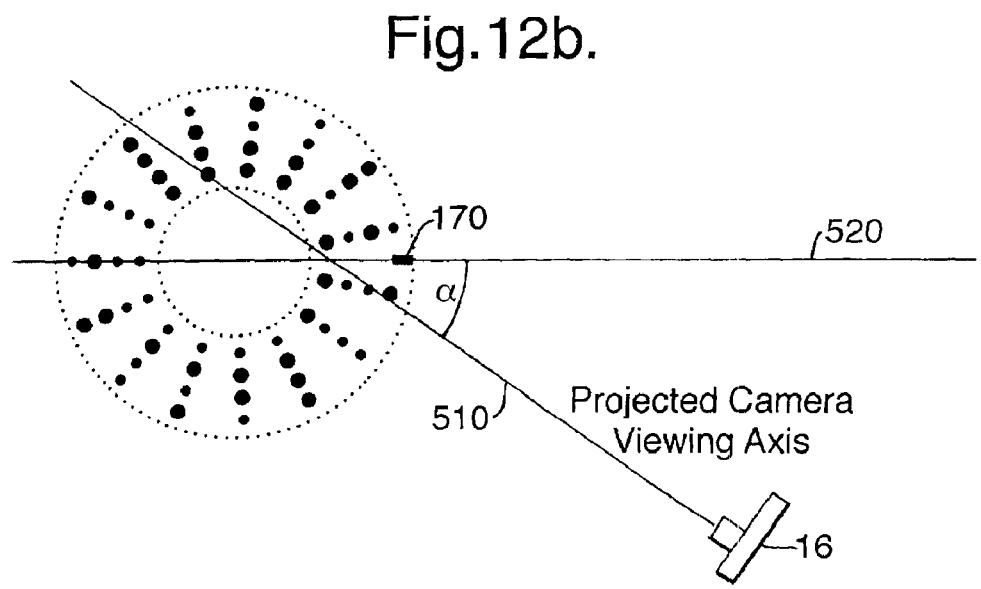

FIG. 12b illustrates the processing performed at steps S11-6 and S11-8.

Referring to FIG. 12b, the projected camera viewing axis in the two-dimensional plane of the calibration pattern is illustrated at 510, and the line connecting the centre of the calibration pattern and the front marker 170 is illustrated at 520. The angle a between the projected camera viewing axis 510 and the line 520 connecting the centre of the calibration pattern and the front marker 170 is the angle calculated by processing apparatus 6 at step S11-8.

At step S11-10, processing apparatus 6 determines whether there is another input image previously received from customer processing apparatus 2, 4 and stored at step S4-34 which remains to be processed.

Steps S11-2 to S11-10 are repeated until each input image has been processed in the way described above.

At step S11-12, processing apparatus 6 selects the input image determined at step S11-8 to have the smallest angle a between the projected camera viewing axis 510 and the line 520 connecting the centre of the calibration pattern and the front marker 170. In this way, processing apparatus 6 selects the input image which is most front-facing to the front marker 170 and hence which best shows the part of the subject object which the user at customer processing apparatus 2, 4 has arranged to face the front marker 170.

At step S11-14, processing apparatus 6 determines whether the angle α of the input image selected at step S11-12 is less than or equal to a predetermined angle (10° in this embodiment).

If it is determined at step S11-14 that the angle α of the selected input image is less than or equal to the predetermined angle, then it is determined that the input image is sufficiently front-facing to the front marker 170, and processing proceeds to step S11-16.

At step S11-16, processing apparatus 6 determines whether the camera viewing axis for the selected image is within a predetermined angle of the horizontal (±30° in this embodiment).

Figure 12C:
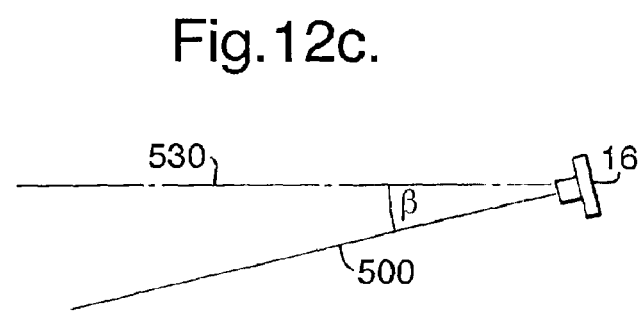

More particularly, referring to FIG. 12c, processing apparatus 6 calculates the elevation angle β between the camera viewing axis 500 and a horizontal line 530, and determines whether the value of β is less than or equal to 30°.

If it is determined at step S11-16 that the camera viewing axis is within ±30° of the horizontal, then it is determined that the selected input image shows the part of the subject object 210 which the user at customer processing apparatus 2, 4 positioned to face front marker 170 sufficiently well that the input image can be displayed as the first image at a third party apparatus.

Accordingly, at step S11-18, processing apparatus 6 makes the 3D data file defining the 3D computer model generated at step S4-38 and the image data of the input image selected at step S11-12 available for access by third-party apparatus.

Referring again to FIG. 8, when steps S8-6 to S8-10 are performed in the third embodiment, the 3D data defining the 3D computer model is transmitted to the third-party apparatus together with the image data defining the selected input image, and instructions instructing the third-party apparatus to display the image data as the first image. Accordingly, at step S8-10, the third-party apparatus displays the image data of the input image previously selected at step S11-12 instead of rendering the 3D computer model to generate an image. However, in response to user input instructions at step S8-12, the 3D computer model is rendered to generate and display subsequent images at the third-party apparatus.

Similarly, referring to FIG. 9, when steps S9-6 and S9-8 are performed in the seventh embodiment, instead of rendering the 3D computer model in accordance with stored viewing parameters, the image data for the input image selected at step S11-12 is transmitted to the third-party apparatus for display.

Referring again to FIG. 11, if it is determined at step S11-14 that the angle α is not less than or equal to the predetermined angle, or is it is determined at step S11-16 that the angle β is not less than or equal to the predetermined angle, then processing apparatus 6 determines that the input image selected at step S11-12 is not sufficiently front-facing to the front marker 170 to show a good image of the part of the subject object 210 which the user at customer processing 2, 4 positioned to face the front marker 170. Accordingly, in this case, processing proceeds to step S11-20 rather than step S11-18.

At step S11-20, processing apparatus 6 calculates data defining a virtual viewing camera for the 3D computer model in the same way as in any of the first, third and fifth embodiment. Alternatively, a default viewing camera may be used as in any of the second, fourth and sixth embodiments.

At step S11-22, processing apparatus 6 makes the data defining the 3D computer model generated at step S4-38 available for access by a third-party apparatus, together with data defining the viewing camera generated at step S11-20 (is applicable).

Eighth Embodiment

An eighth embodiment of the present invention will now be described.

The components of the eighth embodiment and the processing operations performed by the components are the same as those in the seventh embodiment, with the exception that the processing described above with reference to FIG. 11 in the seventh embodiment is changed.

Figure 13:
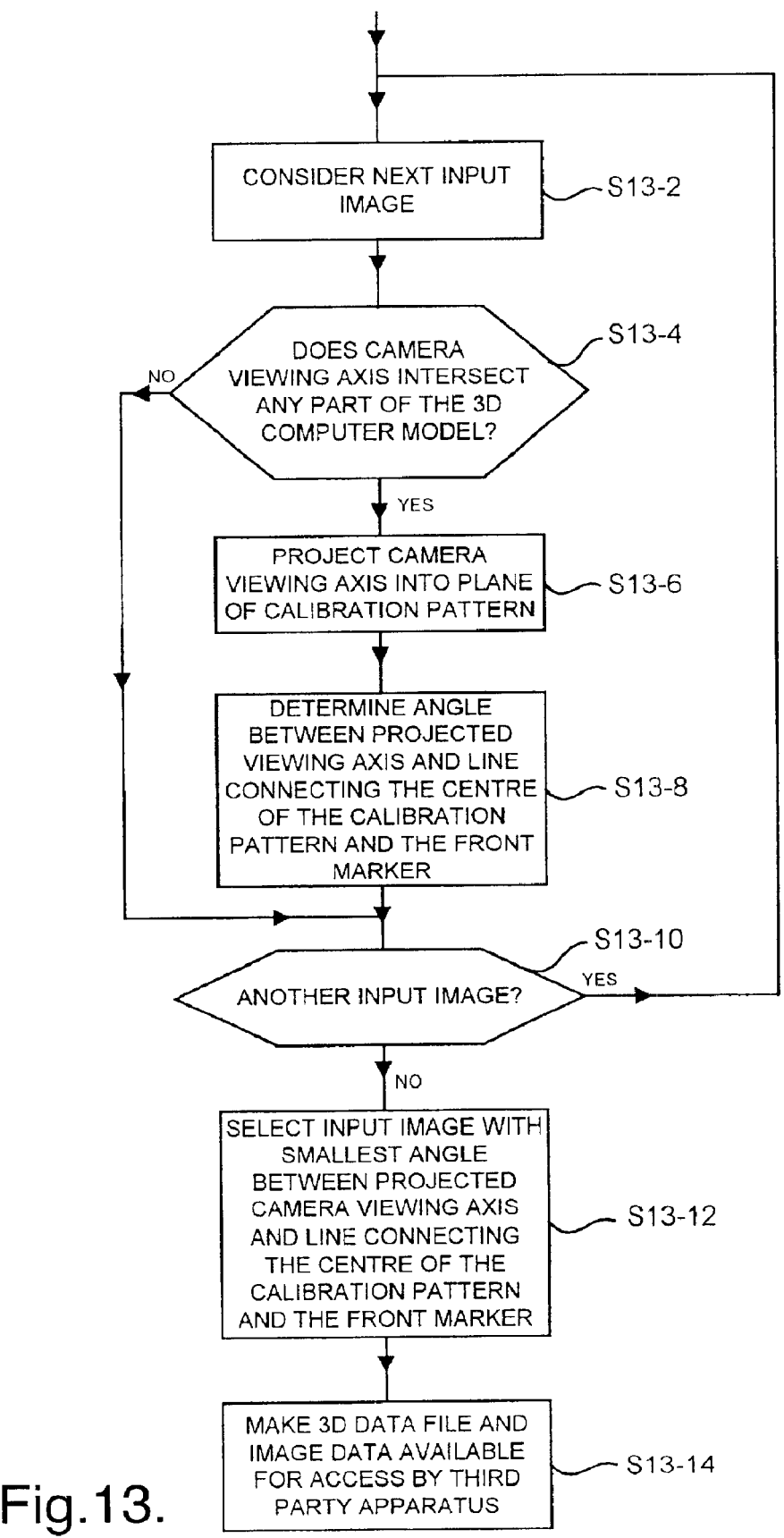
FIG. 13 shows processing operations performed in an eighth embodiment.

FIG. 13 shows the processing operations performed in the eighth embodiment to replace the processing operations performed in FIG. 11 in the seventh embodiment.

Referring to FIG. 13, steps S13-2 to S13-12 correspond to steps S11-2 to S11-12, and accordingly, will not be described again here.

However, in the eighth embodiment, the processing operations performed in the seventh embodiment at steps S11-14, S11-16, S11-20 and S11-22 are omitted. Instead, at step S13-14, processing apparatus 6 makes the 3D data file defining the 3D computer model generated at step S4-38 and the image data of the input image selected at step S13-12 available for access by the third-party apparatus (this processing corresponding to the processing at step S11-18 in the seventh embodiment).

Consequently, in the eighth embodiment, processing apparatus 6 selects the input image received from processing apparatus 2, 4 which is most front-facing to the front marker 170 and the selected input image is the image which is displayed first at a third-party apparatus. Thus, in the eighth embodiment, the first image displayed at the third-party apparatus is always an image received from customer processing apparatus 2, 4 and not an image generated by rendering the 3D computer model of the subject object.

Ninth Embodiment

A ninth embodiment of the present invention will now be described.

The components of the ninth embodiment and the processing operations performed by the components are the same as those in any of the first to sixth embodiments described above, with the exception that some of the processing previously performed in processing apparatus 6 is performed in the third-party apparatus accessing the 3D computer model instead.

More particularly, in the ninth embodiment, processing apparatus 6 performs the processing at step S4-38 to generate the data defining the 3D computer model of the subject object relative to the stored calibration pattern, but does not generate the 3D computer model relative to a default viewing camera (as in the second, fourth and sixth embodiments) and does not generate data defining a viewing camera for the 3D computer model (as in the processing at step S4-40 in the first, third and fifth embodiments).

Instead, in the ninth embodiment, when the third-party apparatus requests access to the 3D computer model, processing apparatus 6 transmits data to the third-party apparatus defining the 3D computer model together with data defining the direction of the front marker 170 relative to the 3D computer model.

Upon receipt of the data from the customer processing apparatus 6, the third-party apparatus generates data defining a viewing camera for the 3D computer model in dependence upon the front marker 170 using processing corresponding to that in the first, third or fifth embodiments above. Alternatively, upon receipt of the data from the processing apparatus 6, the third-party apparatus positions the 3D computer model relative to a default viewing camera in dependence upon the front marker 170, using processing corresponding to that in the second, fourth or sixth embodiments described above.

The third-party apparatus then generates the first image of the 3D computer model using the defined viewing camera or the default viewing camera, as appropriate.

Modifications

Many modifications can be made to the embodiments above within the scope of the present invention.

For example, the subject object 210 does not need to be placed on the photographic mat 24 for imaging. More particularly, the subject object 210 may be placed alongside the mat 24 and images recorded so that at least part of the object and mat are visible in each image. However, the user still positions the subject object so that the part which is to appear in the first image each time the 3D computer model is accessed faces in a defined direction relative to the calibration pattern on the mat.

In the embodiments described above, the printer instructions sent from processing apparatus 6 to a customer computer processing apparatus instruct printer 18 to print photographic mat 24 in accordance with the object size. If the size is so large that a photographic mat 24 cannot be printed on a single sheet of paper, then mat data generator 38 may generate data to control printer 18 to print the photographic mat 24 on separate sheets of paper, which can then be placed together to form the photographic mat 34.

In the embodiments described above, the calibration object which is imaged with the subject object has the form of a two-dimensional photographic mat. However, instead of a photographic mat, a three-dimensional calibration object may be used. For example, mat data generator 38 may generate instructions to control printer 18 to print patterns of features on separate sheets, and the sheets may then be folded into or attached to a three-dimensional object, such as a cube. The cube with the sheets attached can then be used as a three-dimensional calibration object.

In the embodiments above, a front marker 170 is provided on the photographic mat, and the user at customer processing apparatus 2, 4 aligns the subject object 210 on the photographic mat so that the part which is to appear in the first image each time the 3D computer model is accessed faces in the direction of the front marker 170. However, instead of providing a front marker 170, the user at a customer processing apparatus 2, 4 may align the subject object with a predetermined feature (or group of features) in the calibration pattern. For example, referring to FIG. 2 each group of features 100–128 in the calibration pattern is unique. Accordingly, one of the groups of features may be designated as a predetermined group with which the part of the subject object to appear in the first image each time the 3D computer model is accessed should be aligned. The calibration pattern is then defined in the coordinate system so that, referring to FIG. 3, the y-axis passes through the centre of each of the four features in the designated group, rather than through the front marker 170. Because each group of features is unique, the user can easily see how to align the subject object. In this case, therefore, one of the groups of features in the calibration pattern acts as a front marker and a front marker additional to the calibration pattern is not provided.

In the embodiments above, at step S4-22, instructions about how to align the subject object on the photographic mat are generated by processing apparatus 6, and these are then sent to the customer processing apparatus 2, 4 where they are displayed at step S4-29. However, it is not necessary to generate and display alignment instructions. In particular, by printing the word "FRONT" alongside the front marker 170, the way in which the subject object should be aligned may be self-explanatory.

In the embodiments above, reference has been made to the OpenGL standard, but any other suitable standard, such as VRML, may be used.

In the embodiments above, the viewing camera is defined for each separate 3D computer model of a single subject object 210. However, having generated data defining a 3D computer model of a subject object at step S4-38, the 3D computer model may be transformed in a conventional manner into a 3D space containing one or more other 3D computer models of different subject objects. A viewing camera may then be defined for the 3D space containing the plurality of 3D computer models of subject objects at step S4-40, and the data defining the common 3D space with the different 3D computer models of the subject objects therein may be made available at step S4-42. By way of example, processing apparatus 6 may generate data defining a 3D computer model of a set of shelves and each 3D computer model of a subject object may be transformed to a position on a shelf. In this scenario, the techniques described above to enable a user at customer processing apparatus 2, 4 to orientate the subject object 210 so that the desired part is visible in the first image of the 3D computer model are especially important so that the desired part faces the viewing camera with which the first image of the 3D computer model of the shelves and subject objects is generated each time it is accessed.

In the embodiments above, processing apparatus 6 sends instructions to a customer processing apparatus 2, 4 to print or display a photographic mat, and receives images from a customer processing apparatus 2, 4 for processing. However, a printer or display panel may be connected directly to processing apparatus 6 for the printing/display of a photographic mat and recorded images may be input to processing apparatus 6 using a camera connected directly thereto.

In the embodiments described above, mat data generator 38 in processing apparatus 6 sends instructions to a customer processing apparatus 2, 4 to control a printer 18 or display 14 to print or display a photographic mat. However, instead, preprinted photographic mats having calibration patterns thereon defined in data prestored in calibration pattern store 37 may be distributed (for example by post) to the users of the customer processing apparatus 2, 4, so that it is unnecessary to print or display a photographic mat at the customer processing apparatus.

In the embodiments above, processing is performed by camera position and orientation calculator 40 to calculate the intrinsic parameters of the camera 16 which was used to record images of the photographic mat and subject object. However, instead, the intrinsic parameters may be transmitted, from the customer computer processing apparatus 2, 4 to processing apparatus 6 or, default values may be assumed for some, or all, of the intrinsic camera parameters.

In the embodiment above, each camera 16 is a digital camera connected to a customer processing apparatus. However, each camera 16 may be separate from a customer processing apparatus and may transfer data thereto via a memory device or a temporary connection etc. Further, images of the photographic mat and subject object may be recorded using a conventional film camera, and a scanner connected to the customer computer processing apparatus may be used to scan photographs to generate digital image data for transmission to processing apparatus 6.

In the embodiments above, the customer computer processing apparatus 2, 4 to which photographic mat print or display instructions are sent by processing apparatus 6 is also the customer processing apparatus to which image data is input (step S4-30) and which sends the image data to the processing apparatus 6 (step S4-32). However, different customer computer processing apparatus may be used to print or display the photographic mat and to receive input image data and send the image data to the processing apparatus 6. For example, processing apparatus 6 may send print instructions to processing apparatus 2, which uses the instructions to control printer 18 to print a photographic mat 24. Photographic mat 24 and a subject object may then be imaged using a camera 16 and the image data input to a different customer processing apparatus 4, which transmits the image data to processing apparatus 6.

In the embodiments above, the communications network 8 connecting the computer processing apparatus 2, 4, 6 comprises a single network. However, the network may comprise a plurality of connected networks. One or more of the computer processing apparatus 2, 4, 6 may be connected to the network(s) via a wireless connection (for example radio signals).

In the seventh and eighth embodiments described above, at steps S11-18 and S13-14, the image data made available, and subsequently displayed at the third-party apparatus as the first image, comprises the image data of an image as received from customer processing apparatus 2, 4. However, the image data received from customer processing apparatus 2, 4 may be modified before being transmitted to, and displayed at, a third-party apparatus. For example, processing apparatus 6 may perform processing to remove the calibration pattern on the photographic mat from the input image (this processing being simple to perform because the features in the calibration pattern have previously been detected in the input image at step S4-36 to calculate the imaging position and orientation).

In the seventh embodiment, either or both of processing steps S11-4 and S11-16 may be omitted. Similarly, in the eighth embodiment, processing step S13-4 may be omitted.

In the eighth embodiment, because the image displayed at the third-party apparatus is based on an input image recorded at a customer processing apparatus 2, 4, it is unnecessary to carry out the processing at step S4-38 to generate data defining a 3D computer model of the subject object.

In the embodiments described above, processing is performed by computers using processing routines defined by programming instructions. However, some, or all, of the processing could be performed using hardware.

What is claimed is:

1. A method of recording images of a subject object, processing the image data to generate data defining a three-dimensional computer model of the subject object, and rendering the three-dimensional computer model to generate an image thereof to show a predetermined part of the subject object, comprising:

positioning the subject object relative to a calibration pattern so that a selected part of the subject object which is to appear in the image of the three-dimensional computer model is positioned in a predetermined direction relative to the calibration pattern;

recording images of the subject object and calibration pattern from different relative recording positions and/or orientations;

processing data defining the recorded images to calculate the relative positions and orientations at which the images were recorded by comparing the calibration pattern in the images with stored data defining the calibration pattern;

generating data defining a three-dimensional computer model of the subject object relative to the stored calibration pattern using the calculated positions and orientations; and generating data defining an image of the three-dimensional computer model showing the selected part of the subject object using a viewing camera defined relative to the stored calibration pattern.

2. A method using connected computer processing apparatus of processing images of a subject object to generate data defining a three-dimensional computer model of the subject object and processing the three-dimensional computer model to generate an image thereof showing a predetermined part of the subject object, comprising:

sending from a first apparatus to a second apparatus data defining images of a subject object together with a calibration pattern recorded from different relative recording positions and/or orientations, the subject object being positioned relative to the calibration pattern so that a selected part of the subject object which is to appear in the image of the three-dimensional computer model faces in a predetermined direction relative to the calibration pattern;

processing the data defining the images in the second apparatus to calculate the relative positions and orientations at which the images were recorded by comparing the calibration pattern in the images with stored data defining the calibration pattern;

performing processing in the second apparatus to generate data defining a three-dimensional computer model of the subject object relative to the stored calibration pattern using the calculated positions and orientations; and performing processing in the second apparatus or in a third apparatus to generate data defining an image of the three-dimensional computer model showing the selected part of the subject object using a viewing camera defined relative to the stored calibration pattern.

3. A method according to claim 2, further comprising:

sending from the second apparatus to the first apparatus instructions for enabling the first apparatus to control a printing apparatus to print the calibration pattern, and retaining data in the second apparatus defining the calibration pattern for subsequent use; and printing the calibration pattern using the instructions from the second apparatus for imaging with the subject object.

4. A method according to claim 3, wherein the instructions sent from the second apparatus to the first apparatus include instructions for enabling the first apparatus to control the printing apparatus to print a front marker as well as the calibration pattern.

5. A method according to claim 4, wherein the front marker comprises, or includes, the word FRONT or an equivalent.

6. A method according to claim 2, further comprising sending from the second apparatus to the first apparatus information defining the predetermined direction.

7. A method of generating data defining a three-dimensional computer model of a subject object and data defining a viewing camera for the three-dimensional computer model to show a predetermined part of the subject object, comprising:

receiving image data defining images of a subject object together with a calibration pattern recorded at different relative recording positions and/or orientations, the subject object being positioned relative to the calibration pattern so that a selected part of the subject object which is to appear in an image of the three-dimensional computer model generated using the viewing camera faces in a predetermined direction relative to the calibration pattern;

processing the image data to calculate the relative positions and orientations at which the images were recorded by comparing the calibration pattern in the images with stored data defining the calibration pattern;

generating data defining a three-dimensional computer model of the subject object relative to the stored calibration pattern using the calculated positions and orientations; and generating data defining a viewing camera for the three-dimensional computer model for generating image data showing the selected part of the subject object in dependence upon the stored calibration pattern.

8. A method according to claim 7, wherein the viewing axis of the viewing camera is defined in dependence upon the stored calibration pattern.

9. A method according to claim 7, wherein the data defining the viewing camera is generated in dependence upon the stored calibration pattern and at least one of the generated three-dimensional computer model, data defining the height of the subject object and data defining a predetermined value estimating the height of the three-dimensional computer model.

10. A method according to claim 9, wherein the three-dimensional computer model is processed to determine the approximate centre thereof, and wherein the viewing camera is defined in dependence upon the stored calibration pattern and in dependence upon the calculated approximate centre.

11. A method according to claim 10, wherein the approximate centre of the three-dimensional computer model is determined by calculating the centre of a three-dimensional shape bounding the three-dimensional computer model.

12. A method according to claim 9, wherein the viewing camera is defined in dependence upon the stored calibration pattern and in dependence upon data input by a user defining the height of the subject object.

13. A method of generating data defining a three-dimensional computer model of a subject object for rendering by a predetermined viewing camera to show a predetermined part of the subject object, comprising:

receiving image data defining images of a subject object together with a calibration pattern recorded at different relative recording positions and/or orientations, the subject object being positioned relative to the calibration pattern so that a selected part of the subject object which is to appear in an image of the three-dimensional computer model generated using the viewing camera faces in a predetermined direction relative to the calibration pattern;

processing the image data to calculate the relative positions and orientations at which the images were recorded by comparing the calibration pattern in the images with stored data defining the calibration pattern relative to the predetermined camera viewing position and direction; and generating data defining a three-dimensional computer model of the subject object relative to the stored calibration pattern using the calculated positions and orientations.

14. A method according to claim 13, wherein the three-dimensional computer model is generated at a position relative to the stored calibration pattern and in dependence upon at least one of the generated three-dimensional computer model, data defining the height of the subject object and data defining a predetermined value estimating the height of the three-dimensional computer model.

15. A method according to claim 14, wherein, in order to position the three-dimensional computer model, at least one of the stored calibration pattern and the three-dimensional computer model is re-positioned relative to the predetermined viewing camera in dependence upon at least one of the generated three-dimensional computer model, data defining the height of the subject object and data defining a predetermined value estimating the height of the three-dimensional computer model.

16. A method according to claim 14, wherein the three-dimensional computer model is processed to determine the approximate centre thereof, and wherein the three-dimensional computer model is positioned relative to the stored calibration pattern and relative to the calculated approximate centre.

17. A method according to claim 14, wherein the three-dimensional computer model is positioned relative to the stored calibration pattern and relative to a position determined from data input by a user defining the height of the subject object.

18. A method according to claim 7, further comprising transmitting a signal conveying the data defining the three-dimensional computer model, or a derivative thereof, and the data defining the viewing camera.

19. A method according to claim 13, further comprising transmitting a signal conveying the data defining the three-dimensional computer model or a derivative thereof.

20. A method of recording image data of a subject object, processing the image data to generate data defining a three-dimensional computer model of the subject object, and displaying an image to show a predetermined part of the subject object, comprising:

positioning the subject object relative to a calibration pattern so that a selected part of the subject object which is to appear in the image faces in a predetermined direction relative to the calibration pattern;

recording images of the subject object and calibration pattern from different relative recording positions and/or orientations;

processing data defining the recorded images to calculate the relative positions and orientations at which the images were recorded by comparing the calibration pattern in the images with stored data defining the calibration pattern;

generating data defining a three-dimensional computer model of the subject object relative to the stored calibration pattern using the calculated positions and orientations;

selecting data defining a recorded image in dependence upon the stored calibration pattern; and displaying an image in dependence upon the selected image data.

21. A method of generating data defining a three-dimensional computer model of a subject object and data defining an image to show a predetermined part of the subject object, comprising:

receiving image data defining images of a subject object together with a calibration pattern recorded at different relative recording positions and/or orientations, the subject object being positioned relative to the calibration pattern so that a selected part of the subject object which is to appear in an image is in a predetermined direction relative to the calibration pattern;

processing the image data to calculate the relative positions and orientations at which the images were recorded by comparing the calibration pattern in the images with stored data defining the calibration pattern;

generating data defining a three-dimensional computer model of the subject object relative to the stored calibration pattern using the calculated positions and orientations; and generating data defining an image of the selected part of the subject object in dependence upon the stored calibration pattern and the received image data.

22. A method of generating data defining an image of a predetermined part of a subject object, comprising:

receiving image data defining images of the subject object together with a calibration pattern recorded at different relative recording positions and/or orientations, the subject object being positioned relative to the calibration pattern so that a selected part of the subject object which is to appear in an image faces in a predetermined direction relative to the calibration pattern;

processing the image data to calculate the relative positions and orientations at which the images were recorded by comparing the calibration pattern in the images with stored data defining the calibration pattern; and generating data defining an image of the selected part of the subject object in dependence upon the stored calibration pattern and the received image data.

23. A method according to claim 21 or claim 22, wherein, to generate data defining an image, an image defined by the received data is selected in dependence upon the calculated recording positions and orientations relative to the stored calibration pattern, and the image data is generated in dependence upon the selected image data.

24. A method according to claim 23, wherein the generated image data comprises the selected image data.

25. A method according to claim 21 or claim 22, further comprising the step of transmitting a signal conveying the generated image data.

26. A method of processing data defining a three-dimensional computer model, comprising:

receiving data defining a three-dimensional computer model and data defining at least one of a position and a direction relative to the three-dimensional computer model; and positioning the three-dimensional computer model relative to a predefined virtual viewing camera in dependence upon the defined position or direction.

27. A method of processing data defining a three-dimensional computer model, comprising:

receiving data defining a three-dimensional computer model and data defining at least one of a position and a direction relative to the three-dimensional computer model; and generating data defining a virtual viewing camera relative to the three-dimensional computer model in dependence upon the defined position or direction.

28. A method according to claim 26 or claim 27, further comprising generating image data by rendering the three-dimensional computer model in dependence upon the virtual viewing camera.

29. A method according to claim 28, further comprising the step of transmitting a signal conveying the generated image data.

30. A system for recording images of a subject object, and for processing the image data to generate data defining a three-dimensional computer model of the subject object, and rendering the three-dimensional computer model to generate an image thereof to show a predetermined part of the subject object, comprising:

a calibration pattern having a position or direction defined relative thereto; and a data processor comprising:

a position and orientation calculator operable to process data defining images of the subject object and calibration pattern recorded from different relative recording positions and orientations to calculate the relative positions and orientations at which the images were recorded by comparing the calibration pattern in the images with stored data defining the calibration pattern;

a computer model generator operable to generate data defining a three-dimensional computer model of the subject object relative to the stored calibration pattern using the calculated positions and orientations; and an image data generator operable to generate data defining an image of the three-dimensional computer model showing the selected part of the subject object using a viewing camera defined relative to the stored calibration pattern.

31. A system of connected computer processing apparatus for processing images of a subject object to generate data defining a three-dimensional computer model of the subject object and for processing the three-dimensional computer model to generate an image thereof showing a predetermined part of the subject object, comprising:

a first apparatus operable to send to a second apparatus data defining images of a subject object together with a calibration pattern recorded from different relative recording positions and orientations, the subject object being positioned relative to the calibration pattern so that a selected part of the subject object which is to appear in the image of the three-dimensional computer model faces in a predetermined direction relative to the calibration pattern; and a second apparatus having:

a position and orientation calculator operable to process the data defining the images to calculate the relative positions and orientations at which the images were recorded by comparing the calibration pattern in the images with stored data defining the calibration pattern in the images with stored data defining the calibration pattern; and a computer model generator operable to generate data defining a three-dimensional computer model of the subject object relative to the stored calibration pattern using the calculated positions and orientations;

and further comprising an image data generator in the second apparatus or in a third apparatus operable to generate data defining an image of the three-dimensional computer model showing the selected part of the subject object using a viewing camera defined relative to the stored calibration pattern.

32. A system according to claim 31, wherein the second apparatus further includes a data transmitter operable to send to the first apparatus instructions for enabling the first apparatus to control a printing apparatus to print the calibration pattern, and a calibration pattern store for storing data defining the calibration pattern for subsequent use.

33. A system according to claim 32, wherein the second apparatus is operable to send the instructions to the first apparatus including instructions for enabling the first apparatus to control the printing apparatus to print a front marker as well as the calibration pattern.

34. A system according to claim 33, wherein the front marker comprises, or includes, a word.

35. A system according to claim 31, wherein the second apparatus is operable to send to the first apparatus information defining the predetermined direction.

36. Apparatus for generating data defining a three-dimensional computer model of a subject object and data defining a viewing camera for the three-dimensional computer model to show a predetermined part of the subject object, comprising:
  a data receiver for receiving image data defining images of a subject object together with a calibration pattern recorded at different relative recording positions and orientations, the subject object being positioned relative to the calibration pattern so that a selected part of the subject object which is to appear in an image of the three-dimensional computer model generated using the viewing camera faces in a predetermined direction relative to the calibration pattern;
  a position and orientation calculator operable to process the image data to calculate the relative positions and orientations at which the images were recorded by comparing the calibration pattern in the images with stored data defining the calibration pattern;
  a computer model generator operable to generate data defining a three-dimensional computer model of the subject object relative to the stored calibration pattern using the calculated positions and orientations; and
  a viewing camera generator operable to generate data defining a viewing camera for the three-dimensional computer model to generate image data showing the selected part of the subject object in dependence upon the stored calibration pattern.

37. Apparatus according to claim 36, wherein the viewing camera generator is operable to define the viewing direction of the viewing camera in dependence upon the stored calibration pattern.

38. Apparatus according to claim 36, wherein the viewing camera generator is operable to define the viewing camera is arranged to define the viewing camera in dependence upon the stored calibration pattern and at least one of the generated three-dimensional computer model, data defining a predetermined value estimating the height of the three-dimensional computer model.

39. Apparatus according to claim 38, wherein the viewing camera generator is operable to process the three-dimensional computer model to determine the approximate centre thereof, and to define the viewing camera in dependence upon the stored calibration pattern and in dependence upon the calculated approximate centre.

40. Apparatus according to claim 39, wherein the viewing camera generator is operable to calculate the approximate centre of the three-dimensional computer model by calculating the centre of a three-dimensional shape bounding the three-dimensional computer model.

41. Apparatus according to claim 38, wherein the viewing camera generator is operable to define the viewing camera in dependence upon data input by a user defining the height of the subject object.

42. Apparatus for generating data defining a three-dimensional computer model of a subject object for rendering by a predetermined viewing camera to show a predetermined part of the subject object, comprising:
  a data receiver for receiving image data defining images of a subject object together with a calibration pattern recorded at different relative recording positions and orientations, the subject object being positioned relative to the calibration pattern so that a selected part of the subject object which is to appear in an image of the three-dimensional computer model generated using the viewing camera faces in a predetermined direction relative to the calibration pattern;
  a position and orientation calculator operable to process the image data to calculate the relative positions and orientations at which the images were recorded by comparing the calibration pattern in the images with stored data defining the calibration pattern relative to the predetermined camera viewing position and direction; and
  a computer model generator operable to generate data defining a three-dimensional computer model of the subject object relative to the stored calibration pattern using the calculated positions and orientations.

43. Apparatus according to claim 42, wherein the computer model generator is operable to generate the three-dimensional computer model at a position relative to the stored calibration pattern and in dependence upon at least one of the generated three-dimensional computer model, data defining the height of the subject object and data defining a predetermined value estimating the height of the three-dimensional computer model.

44. Apparatus according to claim 43, wherein, in order to position the three-dimensional computer model, the computer model generator is operable to re-position at least one of the stored calibration pattern and the three-dimensional computer model relative to the predetermined viewing camera in dependence upon at least one of the generated three-dimensional computer model, data defining the height of the subject object and data defining a predetermined value estimating the height of the three-dimensional computer model.

45. Apparatus according to claim 43, wherein the computer model generator is operable to process the three-dimensional computer model to determine the approximate centre thereof, and to position the three-dimensional computer model relative to the stored calibration pattern and relative to the calculated approximated centre.

46. Apparatus according to claim 43, wherein the computer model generator is operable to position the three-dimensional computer model relative to the stored calibration pattern and relative to a position determined from data input by a user defining the height of the subject object.

47. A system for recording images of a subject object, for processing the image data to generate data defining a three-dimensional computer model of the subject object, and for displaying an image to show a predetermined part of the subject object, comprising:
  a calibration pattern having a position or direction defined relative thereto; and
  a processing apparatus configured to:
  process data defining images of the subject object and calibration pattern recorded from different relative record positions and orientations to calculate the relative positions and orientations at which the images were recorded by comparing the calibration pattern in the images with stored data defining the calibration pattern;
  generate data defining a three-dimensional computer model of the subject object relative to the stored calibration pattern using the calculated positions and orientations;
  select data defining a recorded image dependence upon the stored calibration pattern; and
  display an image in dependence upon the selected image data.

48. Apparatus for generating data defining a three-dimensional computer model of a subject object and data defining an image to show a predetermined part of the subject object, comprising:

a data receiver for receiving image data defining images of a subject object together with a calibration pattern recorded at different relative recording positions and orientations, the subject object being positioned relative to the calibration pattern so that a selected part of the subject object which is to appear in an image is in a predetermined direction relative to the calibration pattern;

a position and orientation calculator operable to process the image data to calculate the relative positions and orientations at which the images were recorded by comparing the calibration pattern in the images with stored data defining the calibration pattern;

a computer model generator operable to generate data defining a three-dimensional computer model of the subject object relative to the stored calibration pattern using the calculated positions and orientations; and an image data generator operable to generate data defining an image of the selected part of the subject object in dependence upon the stored calibration pattern and the received image data.

49. Apparatus for generating data defining an image of a predetermined part of a subject object, comprising:

a data receiver for receiving image data defining images of the subject object together with a calibration pattern recorded at different relative recording positions and orientations, the subject object being positioned relative to the calibration pattern so that a selected part of the subject object which is to appear in an image faces in a determined direction relative to the calibration pattern;

a position and orientation calculator operable to process the image data to calculate the relative positions and orientations at which the images were recorded by comparing the calibration pattern in the images with stored data defining the calibration pattern; and an image data generator operable to generate data defining an image of the selected part of the subject object in dependence upon the stored calibration pattern and the received image data.

50. Apparatus according to claim 48 or claim 49, wherein the image data generator is operable to select an image defined by the received data in dependence upon the calculated recording positions and orientations relative to the stored calibration pattern, and to generate the image data in dependence upon the selected image data.

51. Apparatus according to claim 50, wherein the image data generator is operable to use the selected image data without modification as the generated image data.

52. Apparatus for processing data defining a three-dimensional computer model comprising:

a data receiver for receiving data defining a three-dimensional computer model and data defining at least one of a position and a direction relative to the three-dimensional computer model; and a computer model positioner operable to position the three-dimensional computer model relative to a pre-defined virtual viewing camera in dependence upon the defined position or direction.

53. Apparatus for processing data defining a three-dimensional computer model, comprising:

a data receiver for receiving data defining a three-dimensional computer model and data defining at least one of a position and a direction relative to the three-dimensional computer model; and a virtual camera generator operable to generate data defining a virtual viewing camera relative to the three-dimensional computer model in dependence upon the defined position or direction.

54. A system for recording images of a subject object, and for processing the images data to generate data defining a three-dimensional computer model of the subject object, and rendering the three-dimensional computer model to generate an image thereof to show a predetermined part of the subject object, comprising:

a calibration pattern having a position or direction defined relative thereto; and processing means comprising:

means for processing data defining images of the subject object and calibration pattern recorded from different relative recording positions and orientations to calculate the relative positions and orientations at which the images were recorded by comparing the calibration pattern in the images with stored data defining the calibration pattern;

means for generationing data defining a three-dimensional computer model of the subject object relative to the stored calibration pattern using the calculated positions and orientations; and means for generating data defining an image of the three-dimensional computer model showing the selected part of the subject object using a viewing camera defined relative to the stored calibration pattern.

55. A system of connected computer processing apparatus for processing images of a subject object to generate data defining a three-dimensional computer model of the subject object and for processing the three-dimensional computer model to generate an image thereof showing a predetermined part of the subject object, comprising:

a first apparatus having means for sending to a second apparatus data defining images of a subject object together with a calibration pattern recorded from different relative recording positions and orientations, the subject object being positioned relative to the calibration pattern so that a selected part of the* subject object which is to appear in the image of the three-dimensional computer model faces in a predetermined direction relative to the calibration pattern; and a second apparatus having:

means for processing the data defining the images to calculate the relative positions and orientations at which the images were recorded by comparing the calibration pattern in the images with stored data defining the calibration pattern; and means for generating data defining a three-dimensional computer model of the subject object relative to the stored calibration pattern using the calculated positions and orientations;

and further comprising means in the second apparatus or in a third apparatus for generating data defining an image of the three-dimensional computer model showing the selected part of the subject object using a viewing camera defined relative to the stored calibration pattern.

56. Apparatus for generating data defining a three-dimensional computer model of a subject object and data defining a viewing camera for the three-dimensional computer model to show a predetermined part of the subject object, comprising:

means for receiving image data defining images of a subject object together with a calibration pattern recorded at different relative recording positions and orientations, the subject object being positioned relative to the calibration pattern so that a selected part of the subject object which is to appear in an image of three-dimensional computer model generated using the viewing camera faces in a predetermined direction relative to the calibration pattern;

means for processing the image data to calculate the relative positions and orientations at which the images were recorded by comparing the calibration pattern in the images with stored data defining the calibration pattern;

means for generating data defining a three-dimensional computer model of the subject object relative to the stored calibration pattern using the calculated positions and orientations; and means for generating data defining a viewing camera for the three-dimensional computer model for generating image data showing the selected part of the subject object in dependence upon the stored calibration pattern.

57. Apparatus for generating data defining a three-dimensional computer model of a subject object for rendering by a predetermined viewing camera to show a predetermined part of the subject object, comprising:

means for receiving image data defining images of a subject object together with a calibration pattern recorded at different relative recording positions and orientations, the subject object being positioned relative to the calibration pattern so that a selected part of the subject object which is to appear in an image of the three-dimensional computer model generated using the viewing camera faces in a predetermined direction relative to the calibration pattern;

means for processing the image data to calculate the relative positions and orientations at which the images were recorded by comparing the calibration pattern in the images with stored data defining the calibration pattern relative to the predetermined camera viewing position and direction; and means for generating data defining a three-dimensional computer model of the subject object relative to the stored calibration pattern using the calculated positions and orientations.

58. A system for recording images of a subject object, for processing the image data to generate data defining a three-dimensional computer model of the subject object, and for displaying an image to show a predetermined part of the subject object, comprising:

a calibration pattern having a position or direction defined relative thereto; and processing means comprising:

means for processing data defining images of the subject object and calibration pattern recorded from different relative recording positions and orientations to calculate the relative positions and orientations at which the images were recorded by comparing the calibration pattern in the images with stored data defining the calibration pattern;

means for generating data defining a three-dimensional computer model of the subject object relative to the stored calibration pattern using the calculated positions and orientations;

means for selecting data defining a recorded image in dependence upon the stored calibration pattern; and means for displaying an image in dependence upon the selected image data.

59. Apparatus for generating data defining a three-dimensional computer model of a subject object and data defining an image to show a predetermined part of the subject object, comprising:

means for receiving image data defining images of a subject object together with a calibration pattern recorded at different relative recording positions and orientations, the subject object being positioned relative to the calibration pattern so that a selected part of the subject object which is to appear in an image is in a predetermined direction relative to the calibration pattern;

means for processing the image data to calculate the relative positions and orientations at which the images were recorded by comparing the calibration pattern in the images with stored data defining the calibration pattern;

means for generating data defining a three-dimensional computer model of the subject object relative to the stored calibration pattern using the calculated positions and orientations; and means for generating data defining an image of the selected part of the subject object in dependence upon the stored calibration pattern and the received image data.

60. Apparatus for generating data defining an image of a predetermined part of a subject object, comprising:

means for receiving image data defining images of the subject object together with a calibration pattern recorded at different relative recording positions and orientations, the subject object being positioned relative to the calibration pattern so that a selected part of the subject object which is to appear in an image faces in a predetermined direction relative to the calibration pattern;

means for processing the image data to calculate the relative positions and orientations at which the images were recorded by comparing the calibration pattern in the images with stored data defining the calibration pattern; and means for generating data defining an image of the selected part of the subject object in dependence upon the stored calibration pattern and the received image data.

61. Apparatus for processing data defining a three-dimensional computer model, comprising:

means for receiving data defining a three-dimensional computer model and data defining at least one of a position and direction relative to the three-dimensional computer model; and means for positioning the three-dimensional computer model relative to a predefined virtual viewing camera in dependence upon the defined position or direction.

62. Apparatus for processing data defining a three-dimensional computer model, comprising:

means for receiving data defining a three-dimensional computer model and data defining at least one of a position and a direction relative to the three-dimensional computer model; and means for generating data defining a virtual viewing camera relative to the three-dimensional computer model in dependence upon the defined position or direction.

63. A storage device storing instructions for causing a programmable processing apparatus to become operable to perform a method as set out in at least one of claims 7, 13, 21, 22, 26 and 27.

64. A signal conveying instructions for causing a programmable processing apparatus to become operable to perform a method as set out in at least one of claims 7, 13, 21, 22, 26 and 27.

* * * * *

UNITED STATES PATENT AND TRADEMARK OFFICE
CERTIFICATE OF CORRECTION

PATENT NO. : 6,912,490 B2 Page 1 of 2
APPLICATION NO. : 09/983039
DATED : June 28, 2005
INVENTOR(S) : Alexandre Percival Dodge It is certified that error appears in the above-identified patent and that said Letters Patent is hereby corrected as shown below:

ON THE TITLE PAGE [56] REFERENCES CITED:

Foreign Patent Documents, insert:
--GB 2 325 996 A    12/98
  EP  0 790 584 A2  08/97
  EP  0 794 517 A2  09/97
  EP  0 794 516 A2  09/97
  EP  0 930 583 A1  07/99--.

ON THE TITLE PAGE [75]:

Inventor, "Alexandre Percival Dodge, Berkshire, (GB)" should read
--Alexandre Percival Dodge, Bracknell, (GB)--.

COLUMN 28:

Line 39, "patteren" should be deleted; and
Line 40, "in the images with stored data defining the calibration" should be deleted.

COLUMN 29:

Line 53, "dependence" should read --dependence upon the stored calibration pattern and in dependece--.

UNITED STATES PATENT AND TRADEMARK OFFICE
CERTIFICATE OF CORRECTION

PATENT NO. : US 6,912,490 B2
APPLICATION NO. : 09/983039
DATED : June 28, 2005
INVENTOR(S) : Alexandre Percival Dodge It is certified that error appears in the above-identified patent and that said Letters Patent is hereby corrected as shown below:

COLUMN 30:

Line 60, "image" should read --image in--.

COLUMN 32:

Line 16, "generationing" should read --generating--.

Signed and Sealed this

Twenty-fifth Day of July, 2006

JON W. DUDAS
*Director of the United States Patent and Trademark Office*